United States Patent

Kan et al.

[15] 3,636,314

[45] Jan. 18, 1972

[54] DIGITAL INCREMENTAL PLOTTER SYSTEM

[72] Inventors: Philip T. Kan, Glendale; Andrew S. Huson, Northridge, both of Calif.

[73] Assignee: Benson-Lehner Corporation, Van Nuys, Calif.

[22] Filed: Apr. 6, 1967

[21] Appl. No.: 628,923

[52] U.S. Cl. .......................235/61.6 R, 33/1 M, 235/151.11

[51] Int. Cl. .................G01d 11/00, G05b 19/16, G06g 7/64

[58] Field of Search...............235/61.6 A, 61.6, 61.115, 151, 235/151.11, 197; 33/1 M

[56] References Cited

UNITED STATES PATENTS

| | | | |
|---|---|---|---|
| 3,277,445 | 10/1966 | Diamant et al. | 235/61.9 X |
| 3,293,651 | 12/1966 | Gerber et al. | 235/151 X |
| 3,297,924 | 1/1967 | Kamm | 235/197 X |
| 3,297,929 | 1/1967 | Gardner et al. | 235/61.6 A X |
| 3,366,928 | 1/1968 | Rice et al. | 340/172.5 |
| 3,366,931 | 1/1968 | Githens | 340/172.5 |
| 3,434,113 | 3/1969 | Wiley et al. | 340/172.5 |

*Primary Examiner*—Maynard R. Wilbur
*Assistant Examiner*—Thomas J. Sloyan
*Attorney*—Warren T. Jessup

[57] ABSTRACT

An improved digital incremental plotter system is provided in which information to be plotted is derived from an associated digital computer in the form of successive blocks of data each comprising a series of instructions, either directly on-line, or in an off-line manner from a magnetic tape transport or equivalent storage unit.

3 Claims, 24 Drawing Figures

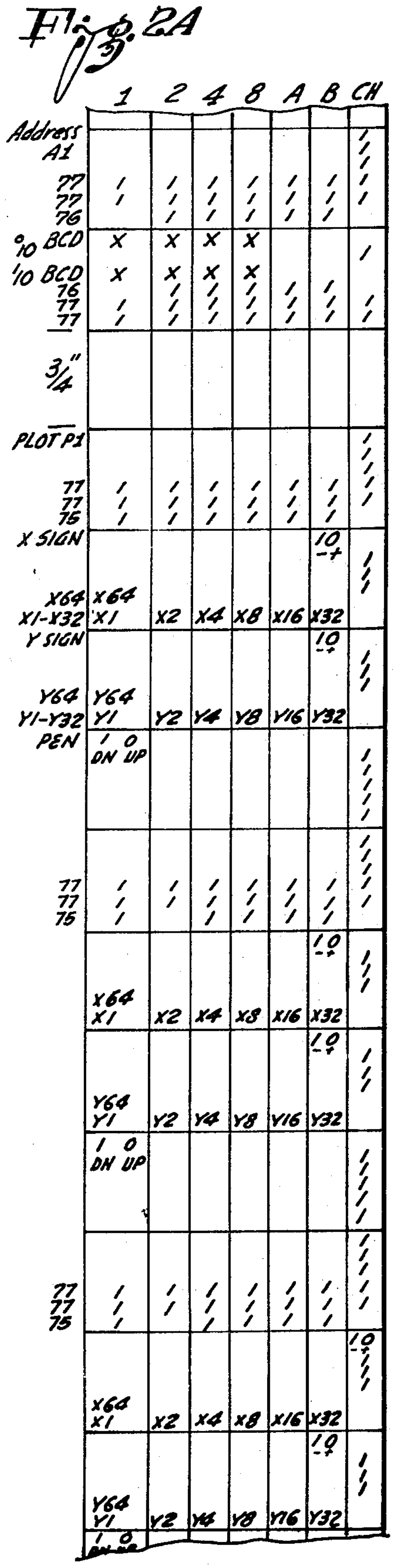
FIG. 2A
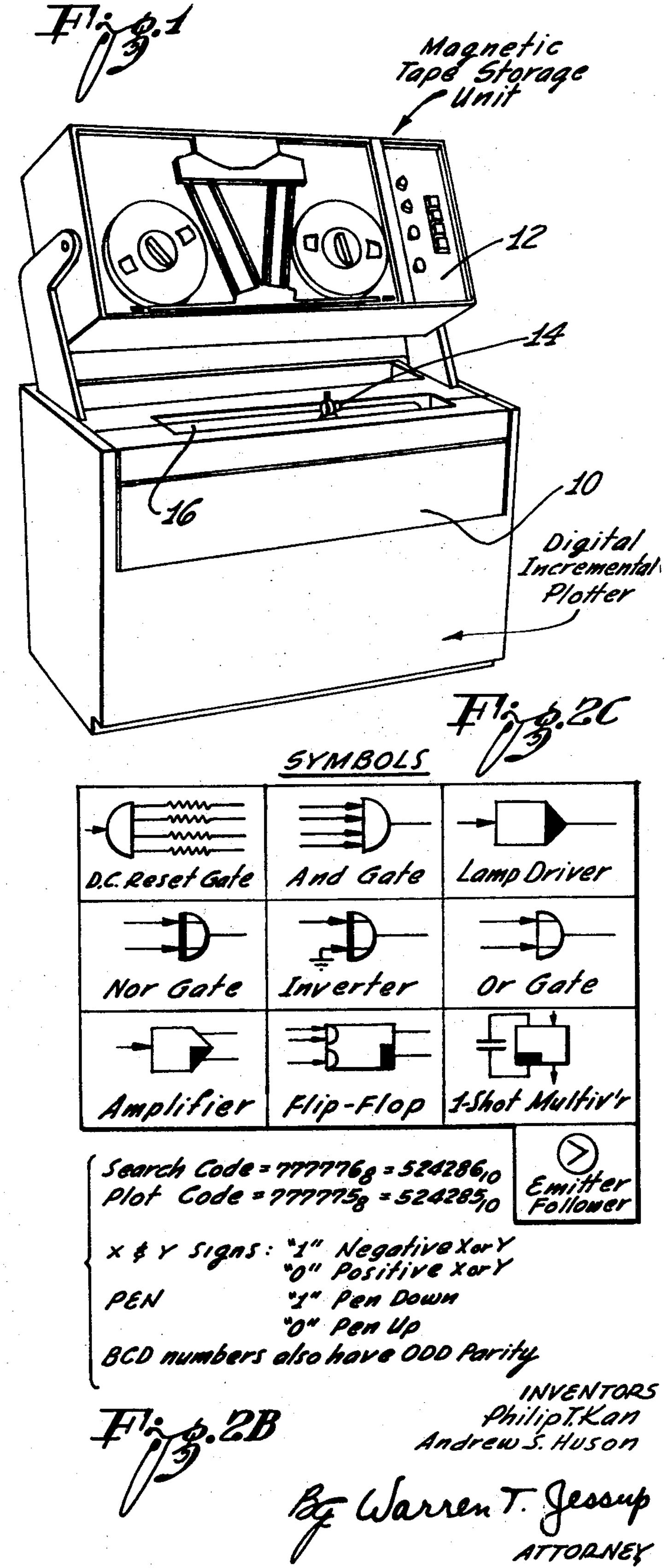
FIG. 1, FIG. 2C
FIG. 2B
INVENTORS
Philip T. Kan
Andrew S. Huson
By Warren T. Jessup
ATTORNEY INVENTORS:
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS:
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson
By Warren T. Jessup
ATTORNEY INVENTORS
Philip T. Kan
Andrew S. Huson By Warren T. Jessup
ATTORNEY.

INVENTORS
Philip T. Kan
Andrew S. Huson
By Warren T. Jessup
ATTORNEY

INVENTORS:
Philip T. Kan
Andrew S. Huson
By Warren T. Jessup
ATTORNEY

DIGITAL INCREMENTAL PLOTTER SYSTEM

BACKGROUND OF INVENTION

As mentioned above, the present invention is concerned with an improved digital incremental plotter system which is intended to be used either directly in conjunction with a digital computer, or in an off-line manner in conjunction with a magnetic tape on which information from the computer has previously been recorded. The incremental plotter system of the invention is intended primarily to constitute an output readout means for the computer, so that various curves and other data represented by the binary coded data output from the computer may be represented in visual or graphic form. The output from the computer, as will be described, is provided in a series of successive blocks, each comprising a separate curve or set of data. These blocks are either processed directly by the readout system of the invention so that successive curves and other data produced by the computer may be reduced to a graphic and visual record. When the incremental plotting system of the invention is used, for example, in conjunction with a magnetic tape record, it is preferable for the various blocks of information to be addressable, so that any desired curve or other data may be selected at will for reproduction.

High-speed digital incremental plotters are known which respond to the application of digital incremental signals. In such plotters, the actual plot is produced by the movement of a pen over a recording paper. The pen is moved, for example, along a first (Y) axis, and the paper is moved along a second (X) axis which usually is perpendicular to the first axis. That is, the Y-axis plot is produced by lateral movements of the pen, and the X-axis plot is produced by lateral movement of the recording paper. The movements of the recording paper are produced, for example, by incremental rotations of a drum which supports and drives the recording paper. Discontinuous lines, or Z-axis plots, may be realized by means of a pen solenoid which moves the pen into or out of contact with the paper whenever the solenoid is energized or deenergized.

A typical prior art incremental plotter employs two bidirectional step motors. One of the motors responds to X-axis digital signals to drive the paper-supporting drum in one rotational direction or the other. The other motor responds to Y-axis digital signals to drive the pen in one lateral direction or the other.

Each digital pulse applied to either of the step motors causes it to rotate one increment in one direction or the other. The control is such that each pulse applied to either motor moves the motor one increment from its previously established angular position, in contrast to systems in which all control signals are referenced to a common origin.

Although the digital incremental plotter described in the preceding paragraphs may be directly coupled to a digital computer to provide a graphic representation of the output of the computer, or the like; it is usual to provide a storage system such as a magnetic tape transport between the computer and the plotter for appropriate and convenient off-line operation of the plotter. The instructions from the computer for controlling the plotter are, in the latter instance, recorded in a succession of X-, Y- and Z-incremental groups on the magnetic tape in the transport. The successive groups of instructions make up different blocks pertaining to different sets of output information to be plotted by the plotter. These blocks are identified by different address designations.

Therefore, whenever a particular set of output data from the computer is to be plotted, the block of X-, Y- and Z-instructions on the magnetic tape which corresponds to that output data is addressed by the control system of the plotter. Then, when that particular block is reached, the X-, Y- and Z-instructions of the corresponding group of instructions in the block are read successively out from the tape, and are used to control the plotter.

For example, in a prior art type of digital incremental plotter system, each block of information includes a series of single increment instruction groups. Each instruction group, in turn, includes an X-instruction as to the X-axis increment (which is either 0, +1 or −1); a Y-instruction as to the Y-axis increment (either 0, +1 or −1), and a Z-instruction as to the Z-axis plot (either + or −) to indicate whether the pen is to be up or down for the corresponding X-, Y-increments.

The X-, Y-, Z-instructions in the prior art system are read successively from the tape as the selected block is sensed; and, as noted, each represents a single increment (of the order, for example, of 10 mils). Therefore, as each X- or Y-instruction in the group is sensed, the associated plotter is moved a maximum of one increment.

SUMMARY OF INVENTION

In the system of the present invention, each of the X- and Y-instructions in each group takes the form of a binary coded multibit word which designates the number of increments the plotter is to be stepped (along either the X- or Y-axis) in response to that particular instruction. This means that a single instruction can cause the plotter to be stepped through any desired number of increments within established limits, rather than but through a single increment as is the case in the prior art system discussed above. This concept reduces by a significant factor (for example, of the order of at least 10–1) the computer write time requirements, as compared with the prior art type of system referred to above.

In a constructed embodiment of the invention, for example, up to 127 incremental steps in the X- or Y-direction, or both, are possible with a single instruction. When usual present-day magnetic tape is used (which is capable, for example, of storing 800 binary bits per inch), 33 plotter instructions representing up to 4,191 incremental steps on each axis of the plotter may, for example, be contained in each inch of the magnetic tape. Moreover, the system of the invention is such that the plotter can be controlled to draw a continuous line of any slope upon the receipt of a single instruction from the tape.

In the prior art single increment type of digital incremental plotter system, as explained above, a three-bit instruction format is used. This format is not compatible with the usual multibit word that is representative of the output data from the usual present-day electronic digital computer. Therefore, relatively complicated interface circuitry and equipment is required in the prior art system, to convert the computer output into the peculiar type of instruction format required by the prior art plotter.

The digital incremental plotter system of the present invention, on the other hand, is fully compatible with the usual digital computer; and it can also be used in conjunction with card readers, punched paper tape readers, and other standard equipment in the digital data-processing art.

Moreover, the three-bit instructions of the prior art single increment type of digital plotter system result in equipment which is somewhat wasteful of the magnetic tape. Since most present-day computers operate on the basis of six-bit or eight-bit words (plus parity bit), a tape with a corresponding number of channels is usually used in the prior art system in conjunction with such computers. This results, for example, in a seven or nine channel tape being used wastefully to store three-bit instructions.

The system of the present invention, as noted above, utilizes multibit words as instructions for the multi-increment control of the plotter. These words correspond, for example, to the multibit output data from the associated computer. Therefore, in addition to achieving full compatibility with the computer, or with the equivalent data source, full usage of all the channels on the tape is achieved.

Another advantage inherent in the digital incremental plotter system of the present invention, in its use of multibit computer words for the multiple increment control of the plotter, is that a parity bit channel may be incorporated, and conventional parity check circuitry can be incorporated to provide a parity check for each character constituting the different X- and Y-instructions.

An object of the present invention, therefore, is to provide an improved high-speed reliable digital incremental plotter system which is fully compatible for off-line, or online operation with present-day high-speed electronic digital computers; or with other sources of digital data such as punched card or punched paper tape.

Another object of the invention is to provide such an improved digital incremental plotter system which is constructed so as to reduce the time required to transfer information from the source into the plotter system by a significant factor, as compared with prior art types of plotter systems, so as to provide for more efficient usage of the associated digital computer or other data source.

Among the features of the digital incremental plotter system to be described, in addition to the multiple-incremental control of the plotter described briefly above, is its ability to search at increased speed in a forward or reverse direction for the next addressed block of data. When a search mode is initiated, the system moves to the first address and compares it with the desired address, and it then automatically selects the direction which represents the shorter distance to the addressed block.

Also, the improved digital incremental plotter system to be described herein incorporates a plurality of different clock rates for different instructions. These clock rates cause the plotter to be stepped automatically through successive increments at a selected stepping rate proportional to the number of increments called for by any particular X- or Y-instruction.

BRIEF DESCRIPTION OF DRAWINGS

FIG. 1 is a perspective view of a typical off-line plotter unit which may incorporate the techniques of the present invention;

FIG. 2A is a schematic showing as to how the plotter instructions for the system of the invention may be stored in a magnetic tape storage unit;

FIG. 2B is a table of selected identifying information used in the embodiment to be described;

FIG. 2C explains the symbols used in the schematic representation herein of certain logic gates and other logic elements;

DESCRIPTION OF PRESENTLY PREFERRED EMBODIMENT

Figure 3:
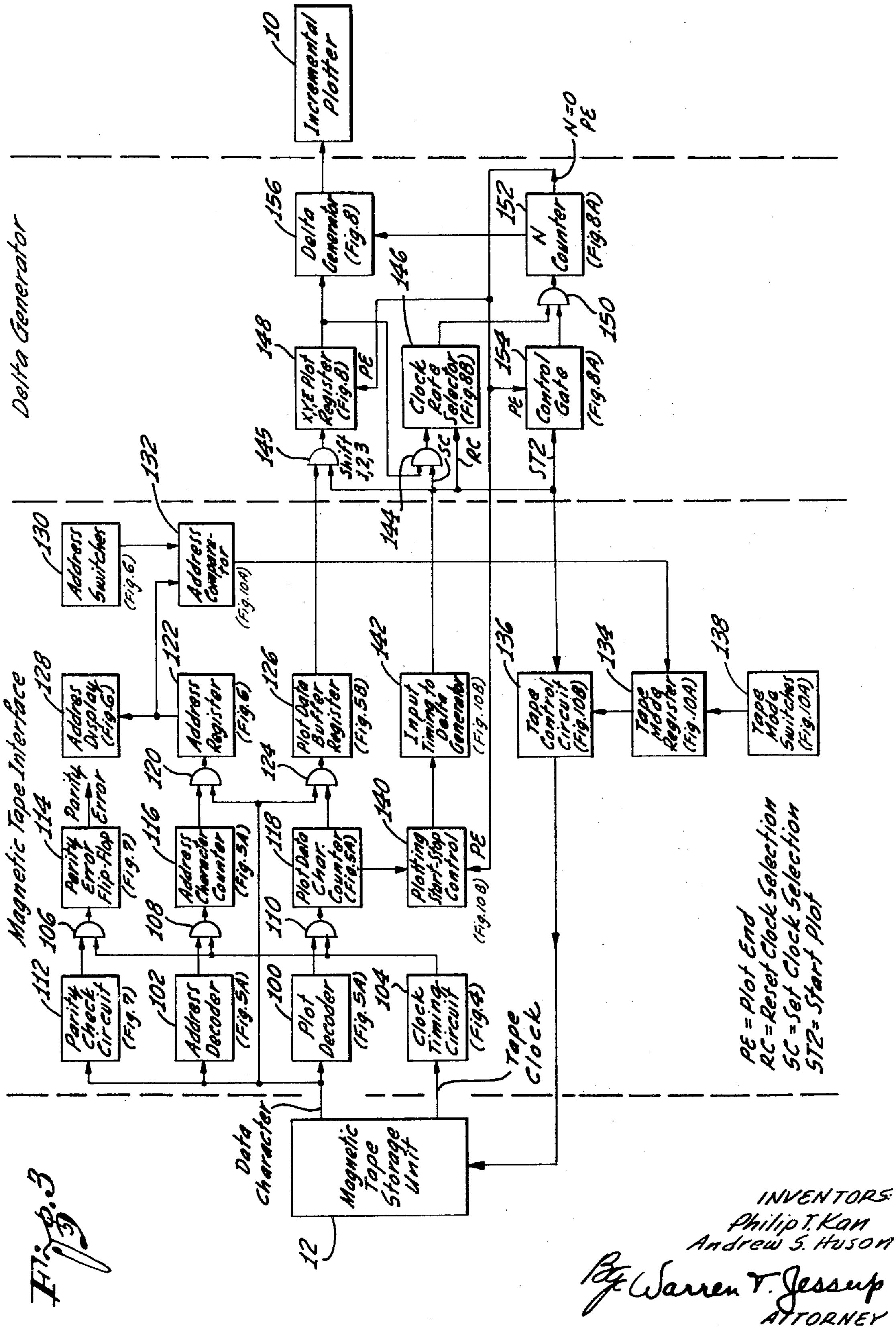
FIG. 3 is a block diagram of a system representative of one embodiment of the invention.

The unit shown in FIG. 1 includes a plotter 10 which is under control of instructions stored in a magnetic tape storage 12. As mentioned previously, the plotter 10 is an incremental plotter in which a pen 14 is moved over a recording paper 16 in response to signals received from the tape storage 12.

The pen 14, for example, is moved to the left and right in FIG. 1 under the control of Y-axis instructions, and the paper 16 is moved perpendicularly with respect to the pen in response to X-axis signals from the magnetic tape storage. In addition, the pen 14 may be moved in and out of engagement with the paper in response to Z-axis signals from the magnetic tape storage.

Under the control of the X-, Y- and Z-axis signals any desired plot may be recorded on the paper 16. Also, and as will be described, the X- and Y-instructions to the plotter are introduced simultaneously so that the pen can be effectively moved diagonally with respect to the paper.

As shown in FIG. 2A, the instructions for the plotter 10, which are derived from an associated data processor (not shown), may first be stored in the magnetic tape storage 12. In the embodiment under consideration, the instructions are recorded on the magnetic tape in the storage in six channels plus a parity channel, as a succession of blocks, or groups of X-, Y- and Z-instructions. Each block is preceded by a distinctive address so that the particular group may be addressed at will and the plotter made to respond to the data represented thereby.

In the representation of FIG. 2A, for example, a particular group of X-, Y- and Z-plot data instructions is shown, the group being preceded by an address A1. The tape is always read from the top down in FIG. 2, when a desired block has been reached. This occurs during the plot mode, and after the completion of a search mode. The operation during the search mode is such that the tape is searched at a relatively high rate in either direction, as explained above, until the desired address is reached. The tape then stops with the magnetic storage unit in position to read the block of plot data associated with the desired address. The operator then depresses a "plot" button, and the tape is scanned through the particular block, always from the top down in FIG. 2.

As the seven channels (1, 2, 4, 8, A, B, CH) are read, by seven associated read heads, octal code 77, 77, 76 is sensed. This announces that the following binary coded information is an address and not data. The address is stored on the tape in two separate characters. These are designated as "BCD" numbers in FIGS. 2A and 2B. The first is the "tens" decimal and the second is the "unit" decimal digit. In the particular embodiment, therefore, 0–99 different address blocks of instructions may be stored on the tape.

As shown in FIG. 2A, the address is also identified by octal 77, 77, 76 on the opposite side for reverse direction search. As will be described, whenever a desired address is set into the system, the system will scan the tape to the first address, and then will automatically scan in the direction nearest to the address in question. Regardless of the direction of scanning, the system will stop once the desired address is reached, and will then scan down through the address into the plot data following the address when the "plot" button is pushed.

The plot data is identified by octal 77, 77, 75, as shown in FIG. 2A. A space (for example, of the order of three-fourth inch) is provided between the address and the associated plot data, and a similar space is provided between the end of each block of data and the address of the succeeding block. These spaces provide brief gaps between addresses and plot data, and between successive plot data blocks, so as to permit the associated logic circuitry to "settle" when the system is in the search mode.

Each block of plot data is made up of a succession of X-, Y- and Z-instructions, as noted above. For example, after the plot data has been identified by the 77, 77, 75 octal designation, the sign bit of the first X-instruction is first sensed (channel B). Then after a space of three tape characters, the most significant X-bit (X 64) is sensed in channel 1. Following that, the remaining six X-bits are sensed simultaneously in channels 1, 2, 4, 8, A, B. The sign bits determine the direction of movement along the X- or Y-axes (FIG. 2B).

The process is then repeated for the first Y-instruction. For the first Z-instruction, channel 1 is sensed to determine whether the pen is to be up or down for the first X- and Y-instructions. The following eight tape characters are blank. The blank characters allow space for the magnetic tape unit to stop and start. After reading one instruction, the magnetic tape unit will stop and wait until the control unit commands it to start.

Upon command, the scan then moves to the second X-, Y- and Z-instructions, and on until the end of the block. In each instance, and as shown in FIG. 2A, the computer provides a parity check bit in the CH-channel for each tape character.

It should be remembered that each X- and Y-instruction in any particular block does not represent a single incremental movement of the plotter. Rather, each X- and Y-instruction is in the form of a binary coded number which represents a corresponding number of incremental movements (0–127in the illustrated embodiment).

As noted above, the various components which make up the system of the invention, in the embodiment to be described herein, are shown in block form in FIG. 3. The various symbols used in FIG. 3, and throughout the drawings herein are explained in FIG. 2C.

As the signals are read from the tape, in the sequence described above, they are passed to a plot decoder 100 and to an address decoder 102. The plot decoder passes the X-, Y- and Z-instruction signals in response to the 77, 77, 75 octal identification; whereas, the address decoder passes the address signals in response to the octal 77, 77, 76 identification.

The tape is also sensed for clock pulses, and a clock pulse is derived for each character of the tape at which data or parity bits appear. These clock pulses are introduced to a clock-timing circuit 104 which, as will be described, produces timing signals for the system.

The aforesaid timing signals are applied to AND-gates 106, 108 and 110; and they serve to clock the application of data from a parity check circuit 112 to a parity error flip-flop 114, from the address decoder 102 to an address character counter 116, and from the plot decoder 100 to a plot data character counter 118.

The address character counter 116 is connected through an AND-gate 120 to an address register 122. The plot data character counter 118 is connected through an AND-gate 124 to a plot data buffer register 126. The derived data from the tape is also introduced to both AND-gates 120 and 124.

It will be appreciated that upon the receipt of an address identification octal code 77, 77, 76; the address decoder 102 causes the address character counter 116 to be activated. The latter counter is timed so that first the first character of the corresponding address, and then the second character are stored in the address register 122. This causes an address display unit 128 (which may, for example, be a Nixie tube) to display the particular address.

Likewise, upon the receipt of the following plot data identification octal code 77, 77, 75; the plot decoder causes the plot data character counter 118 to be activated so that the plot data characters may be selectively stored in the plot data buffer register 126. The count is such that all the characters making up the X-, Y- and Z-commands of a single instruction are successively stored in the register 126.

The address of a desired block of instructions on the tape is set up by appropriate address switches, represented by the block 130. This address is compared with the addresses successively appearing in the register 122 in an address comparator circuit of any known type, as represented by the block 132.

When the desired address is reached, the comparator 132 actuates a tape mode register 134 which, in turn, causes a tape control circuit 136 to stop the tape. The operator then pushes the "plot" button and the plot instructions contained in the desired block are then successively read into the system.

A plurality of manually controlled tape mode switches, represented by the block 138, are also provided to control the modes of operation of the tape.

As shown in FIG. 3, the system is divided into two parts. The components described above provide the "magnetic tape interface"; and the components to be described hereinafter make up the "delta generator" which actually generates the incremental signals for driving the incremental plotter 10.

As shown, the plot data character counter 118 controls a plotting start-stop control circuit 140, which in turn controls the input-timing circuit 142 of the delta generator portion of the system.

When the plot data character counter reaches a predetermined count indicating that the next instruction to be processed is in the plot data buffer register 126, the control 140 causes the input-timing circuit 142 to generate simultaneously three pulses SHIFT 1, SHIFT 2 and SHIFT 3. These pulses are applied to the gate 145 to cause the contents of the plot data buffer register 126 to be shifted in parallel into the plot register 148. The control 140 also causes the input-timing circuit 142 to apply a pulse RC to reset the clock rate selector 146, and then a pulse SC to an AND-gate 144. This causes a clock rate selector 146 to examine the plot data of the next instruction (which is now stored in an X-, Y-, Z-plot register 148) and determine the pulse rate of the incremental plotter. As mentioned above, an important aspect of the present invention is the automatic control of the speed of operation of the plotter 10 for each instruction, so that the plotting speed, in each instance, will be tailored to the number of incremental steps required by that instruction.

This means that waste time is automatically reduced to a minimum. For example, if a particular instruction requires but a few incremental steps of the plotter, this is carried out quickly and in a short interval, so that the system can proceed promptly to the next instruction. On the other hand, if an instruction requires a relatively large number of incremental steps, the speed slows down to enable the plotter to be moved through the indicated number of incremental operations before the system passes on to the next instruction. The selected clock pulses from the block rate selector 146 are introduced to an AND-gate 150 which passes these pulses to a seven-bit N-counter 152, under the control of a control gate 154. This control is initiated by a pulse ST2, which is generated by the input-timing circuit 142 after the clock rate has been selected. The ST2 pulse also causes the tape control circuit 136 to read a new tape plot data instruction while the N-counter is still counting.

At the end of a predetermined count, corresponding to the completion of a plot by a particular instruction, the N-counter returns to 0. At that time it generates a PE-term which resets the plot register and disables the control gate 154. The timing circuit 142 now generates simultaneously the three pulses SHIFT 1, SHIFT 2 and SHIFT 3. These pulses are applied to a gate 145 to cause the contents of the plot data buffer register 126 to be shifted in parallel into the plot register 148, so that a new instruction is shifted into the plot register.

The above-described operation is now repeated insofar as the new instruction is concerned, and this is repeated until all the instructions in the addressed block have been processed, and the data represented thereby has been recorded by the plotter.

The N-counter 152 controls a delta output generator 156 at the selected clock rate for the particular instruction in the X-, Y-, Z-plot register 148. The outputs from the generator 156 cause the plotter 10 to be moved in incremental steps, as specified by the X- and Y-commands of the instruction stored in the plot register, with the pen in or out of contact with the paper as specified by the Z-command.

The system of the invention is shown in more detail in FIGS. 4–10.

Figure 4:
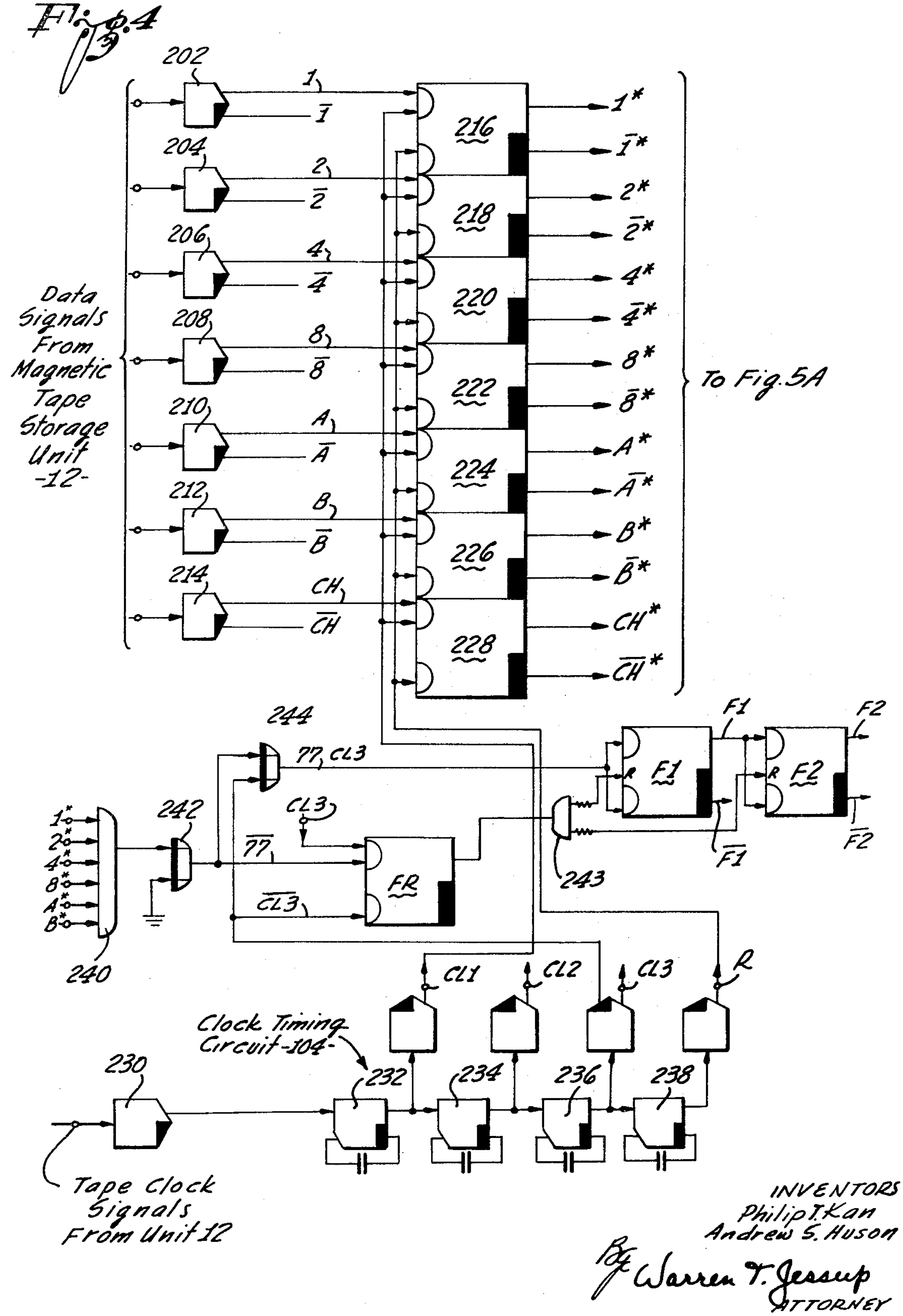
FIG. 4 is a circuit and block diagram of a clock-timing circuit and data register used in the system of FIG. 3.

As shown in FIG. 4, the signals sensed from the seven channels 1, 2, 4, 8, A, B, CH of the tape (FIG. 2) are respectively amplified in amplifiers 202, 204, 206, 208, 210, 212 and 214. The outputs of the amplifiers are stored in a register composed of a group of flip-flops 216, 218, 220, 222, 224, 226 and 228.

The tape clock signals sensed from the tape are amplified in an amplifier 230 and introduced to a series of one-shot multivibrators 232, 234, 236, 238. The multivibrators form a delay chain and serve to generate a series of clock-timing signals CL1, CL2, CL3 and a reset signal R, between each successive clock signal derived from the tape.

The clock signals CL1 control the timing of the flip-flops 216, 218, 220, 222, 224, 226 and 228; so that each character sensed from the tape is stored into the register formed by those flip-flops at CL1 clock time.

The "true" outputs from the flip-flops 216, 218, 220, 222, 224 and 226 are all applied to an AND-gate 240 which decodes for octal "77." When octal 77 is sensed, the AND-gate 240 passes an output through an inverter 242 to a flip-flop FR. The output from the inverter 242 inhibits the flip-flop FR from being set at CL3 clock time when octal 77 is sensed.

The set output terminal of the flip-flop FR is connected to the flip-flop F1 and F2 through a DC reset gate 243. So long as the flip-flop FR is in a reset condition, the flip-flops F1 and F2 will not be reset by it.

The AND-gate 240 also causes the term 77.CL3 to be passed through a NOR-gate 244 to the set input terminal of a flip-flop F1 and to its reset input terminal. The term $\overline{CL3}$ is applied to the reset input terminal of the flip-flop FR.

When any input, other than octal 77 is applied to the flip-flop FR, the flip-flop is set at CL3 clock time by the term $\overline{77}$. This causes both the flip-flops F1 and F2 to be reset. The flip-flop FR is then reset at the next clock time by the term $\overline{CL3}$.

When the first octal 77 is sensed, the flip-flop F1 is set at CL3 time by the term 77.CL3 from the gate. The detection of the second 77 causes the flip-flop F1 to be reset. The resetting of the flip-flop F1 causes the flip-flop F2 to be set. Thus we have the condition $\overline{F1}$.F2 which indicates the detection of octal 77, 77.

The AND-gates 300 and 302 (FIG. 5) respond to the terms $\overline{F1}$ and F2, and to the additional terms shown in FIG. 5, so that the AND-gate 302 may produce an output when 77, 77, 76 is sensed (which identifies an address); and so that the AND-gate 300 may produce an output when 77, 77, 75 is sensed (which identifies a plot instruction). However, in the case of the AND-gate 300, the system must be in the "PLOT" mode before it will produce its output.

When an address identifier 77, 77, 76 is sensed, the AND-gate 302 passes an output to the set input terminal of a flip-flop FS1. The flip-flop FS1, together with additional flip-flops FS2, FS3 and FS4 are connected to form the address character counter 116 of FIG. 3. The address character counter 116 is controlled by the tape clocks CL3 through four steps. At the end of four steps it returns to the 0 condition, and is not stepped again until a subsequent address identifier 77, 77, 76 is detected.

Figure 5A:
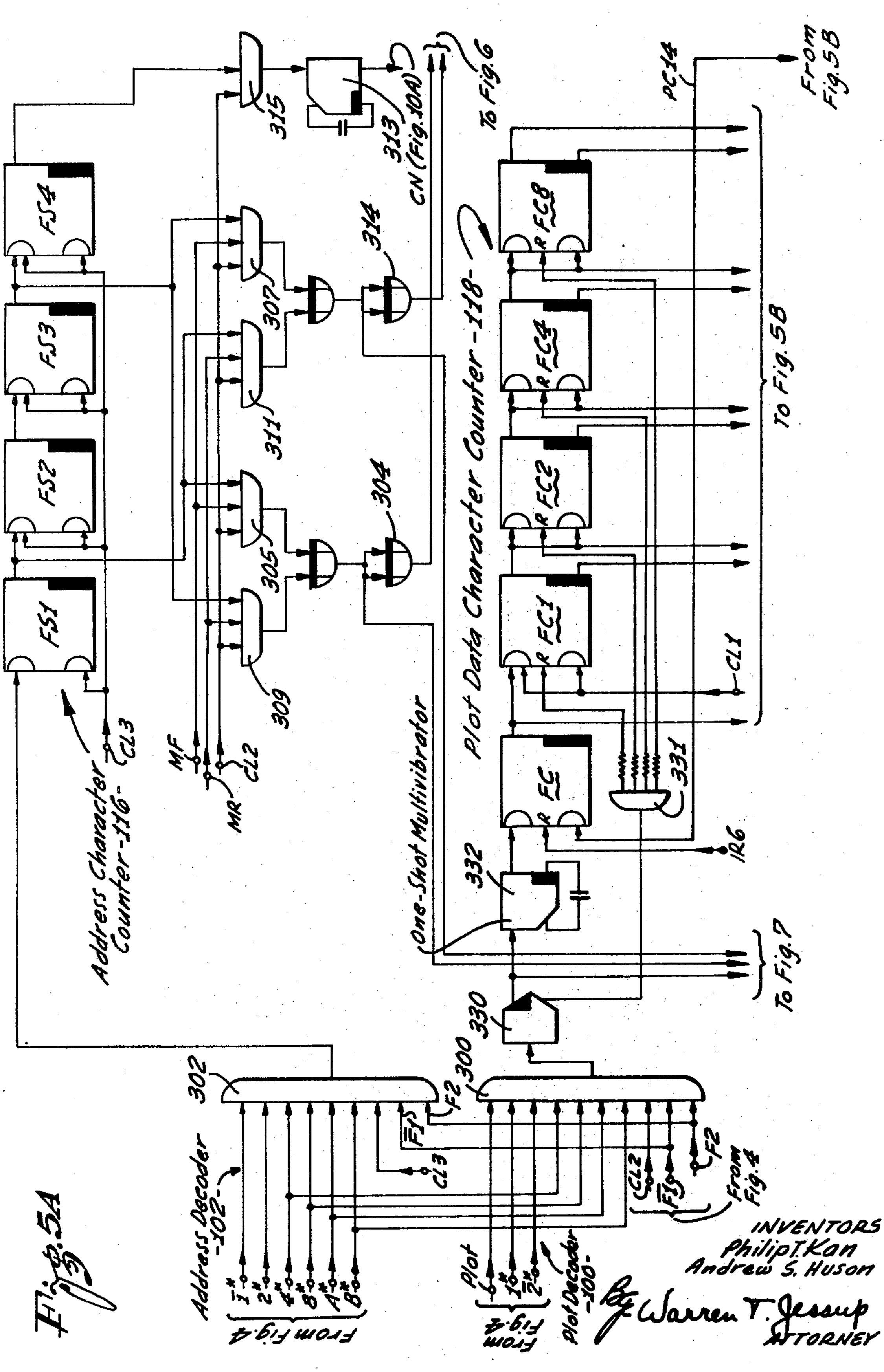
FIGS. 5A and 5B are circuit diagrams and block diagrams of address and plot data decoder circuits included in the system of FIG. 3.
Figure 6:
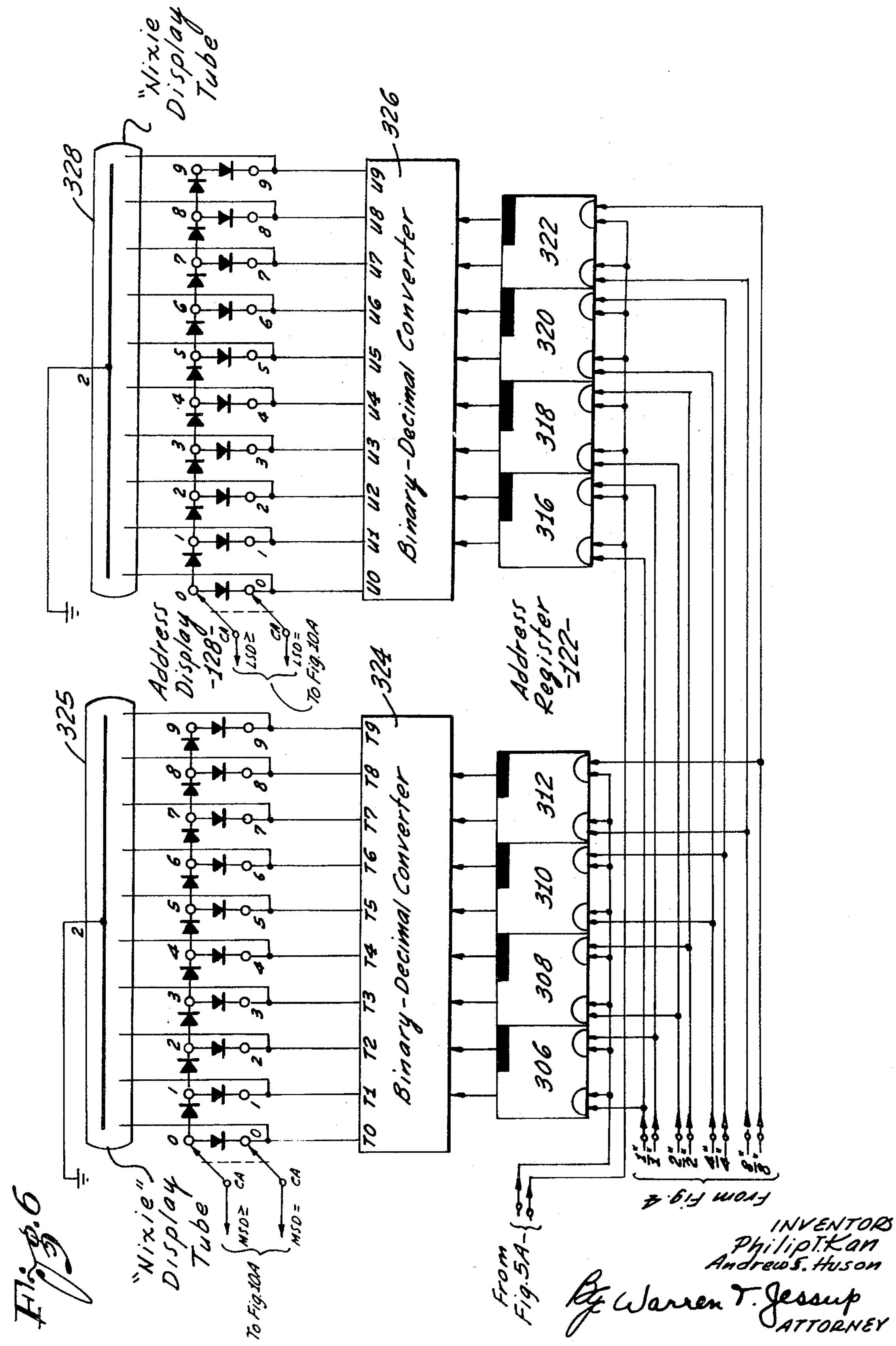
FIG. 6 is an address display circuit also included in the system of FIG. 3.

When the address character counter 116 (FIGS. 3 and 5A) is set to its first step, an output is produced by the gate 304 at CL2 clock time. This output occurs when the first four-bit decimal character of the address (FIG. 2A) is being sensed, and it permits that character to be stored in a first portion of the address register 122 of FIG. 6 formed by a group of flip-flops 306, 308, 310, 312 (FIG. 6). At the next CL3 tape clock time the address character counter 116 is set to its second step. This corresponds to the sensing of the space between the two address characters (FIG. 2A) and no gates are enabled. At the next CL3 tape clock time, the address character counter is set to its third step. This corresponds to the sensing of the second four-bit decimal character of the address (FIG. 2A), and an output is produced by a gate 314 at CL2 clock time.

This latter output permits the second four-bit decimal character of the address to be placed in a second portion of the address register 122 (FIG. 6) which is composed of a series of flip-flops 316, 318, 320 and 322.

At the next CL3 tape clock time, the address character counter 116 is set to its fourth step. At the next CL2 time a one-shot 313 is triggered through a gate 315 to generate a timing pulse CN which is used, as will be described, in the control circuit of FIG. 10A.

The above description presupposes that the tape is moving in such a direction that the address is scanned "down" in the representation of FIG. 2A. During such a condition an enabling voltage level "MF" occurs which conditions the AND-gates 305 and 307 in FIG. 5A so that the described operations may occur.

However, when the address is scanned in the opposite direction, the second four-bit decimal character is sensed first and the first four-bit decimal character is sensed second. In order that in either event, the same characters get stored in the first and second portions of the address register 122 of FIG. 6, the sequence is reversed for the reverse scanning.

During the reverse search mode, an enabling voltage level "MR" is produced, which conditions a pair of AND-gates 309 and 311, rather than the AND-gates 305 and 307. The second character of the address (which may be considered the "units" digit) is now first stored in the second portion of the address register 122 formed by the flip-flops 316, 318, 320 and 322; and the contents of that portion of the address register are passed to a binary-decimal converter 326, which controls a display tube 328. The display tube 328 may, for example, be a "Nixie" tube, and it displays the "units" digit decimal equivalent of the address stored in the address register 122.

Likewise, during the reverse search mode, the first character of the address (which may be considered the "tens" digit) is then stored in the portion of the address register 122 formed by the flip-flops 306, 308, 310, 312; and the contents of the latter register are applied to a binary-decimal converter 324 to control a display tube 325. The display tube 325 may also be a "Nixie" tube, and it displays the "tens" digit decimal equivalent of the address stored in the address register 122. The "Nixie" tubes 325 and 328 may be considered to make up the address display 128 of FIG. 3.

In the manner described above, the two digits of each address on the tape are displayed by the Nixie display tubes 325, 328, as the addresses are successively sensed by the system.

Likewise, when a plot instruction has been identified by the octal code 77, 77, 75, and the system is ready to process the instruction (as indicated by the "PLOT" command), and AND-gate 300 produces an output. This latter output is passed through an amplifier 330, delayed slightly by a one-shot multivibrator 332 (or other suitable delay means), and passed to the set input terminal of a flip-flop FC. The flip-flop FC is previously reset by a manual control reset signal IR6.

The plot data character counter 118 is formed by the flip-flops FC1, FC2, FC4 and FC8. These flip-flops are all reset first by the output from the amplifier 330, through a DC reset gate 331. However, when the AND-gate 300 produces an output in response to an octal 77, 77, 75 plot instruction identifier, the flip-flop FC is set, and successive CL1 clock pulses step the counter. The plot data counter 118 is then counted through 14 steps as the tape moves through all the X-, Y- and Z-characters of the particular instruction, identified by the octal 77, 77, 75 identifier. When the counter is counted through its 14th step the flip-flop FC is reset, so that no further counting can occur until the next 77, 77, 75 identifier is detected.

As the plot data counter 118 counts through its 14 steps, appropriate outputs appear from the AND-gates 340, 342, 344, 346, 348, 350 and 354 (FIG. 5B), as timed by the clock pulses CL3 applied thereto when the system is in the "PLOT" mode through an AND-gate 356 and amplifier 357.

The counting of the character counter 118 first permits the X-sign bit to be stored in a flip-flop BMX (FIG. 5B); the most significant X-bit (X64) to be stored in a flip-flop BX64; and the remaining X-bits to be stored in flip-flops BX32, BX16, BX8, BX4, BX2, BX1, respectively.

The counting of the character counter 118 then permits the Y-sign bit to be stored in a flip-flop BMY; the most significant Y-bit (Y64) to be stored in a flip-flop BY64; and the remaining Y-bits to be stored in flip-flops BY32, BY16, BY8, BY4, BY2, BY1, respectively.

Finally, the counting of the character counter 118 permits the Z-bit (pen command) to be stored in a flip-flop BPD. It will be appreciated that the flip-flops BMX, BX64, BX32, BX16, BX8, BX4, BX2, BX1, BMY, BY64, BY32, BY16, BY8, BY4, BY2, BY1 and BPD form the plot data buffer register 126 of FIG. 3.

Figure 7:
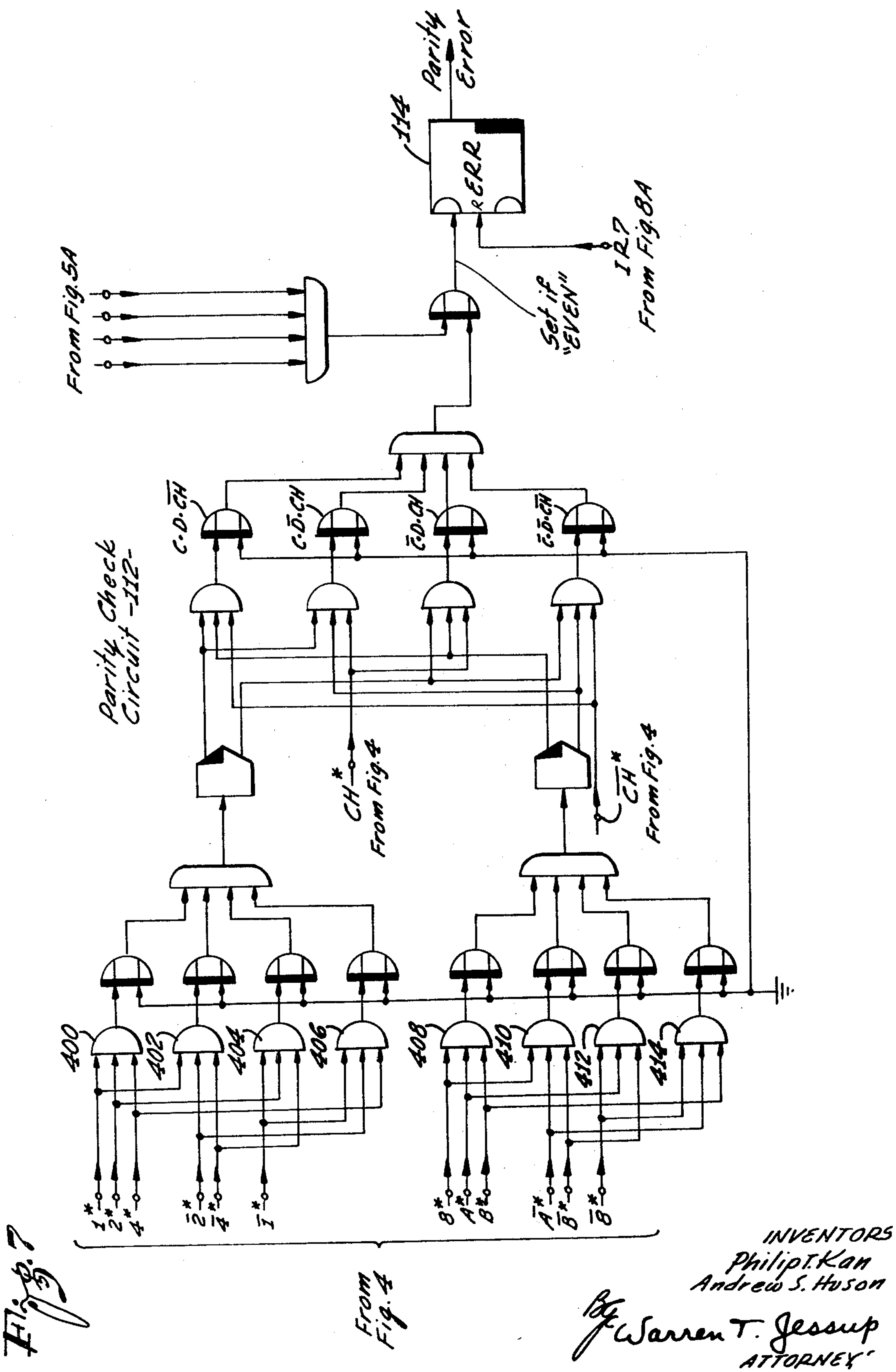
FIG. 7 is a parity check circuit which is incorporated into the system of FIG. 3.

A usual type of parity check circuit is shown in FIG. 7. The various signals sensed from the tape, and which appear in the register 216–228 of FIG. 4, are introduced to a series of AND-gates 400, 402, 404, 406, 408, 410, 412, 414 in FIG. 7. These gates, in conjunction with further illustrated logic, add together the bits (and parity bit, if any) of each data and address character across the tape. The sum should always be odd, since a parity bit is included in the character when the sum would otherwise be even.

In the event of parity error, an "even" sum is realized, and the parity error flip-flop ERR is set. This setting of the parity error flip-flop can be used to light a lamp, sound an alarm, stop the system, or to perform any other desired function as a result of the detection of parity error.

To recapitulate the system thus far described, it is understood then that the tape of FIG. 2 is first scanned until a desired address is reached. Each address is identified by the octal code 77, 77, 76 and as each is sensed, it is displayed as a two-digit decimal number by the display units 325, 328 in FIG. 6, which make up the address display 128 of FIG. 3.

When the desired address is reached the tape transport will stop. Then when the "plot" button is depressed, the system will enter its plot mode, and it will successively sense the X-, Y-, Z-instructions of the accompanying block. Each of the individual instructions is identified by a 77, 77, 75 identifier, so as to assure synchronism with the tape.

When the first instruction is sensed, the various characters of its X-, Y- and Z-commands are stored, in the described manner in the buffer register BMX, BX64, BX32, BX16, BX8, BX4, BX2, BX1, BMY, BY64, BY32, BY16, BY8, BY4, BY2, BY1, BPD. Then the tape is stopped momentarily until the system is ready for the next instruction.

The X-, Y-, Z-plot registers and the clock rate selector logic are shown in detail in FIGS. 8A, 8B, 8C, 8D. The contents of the plot data buffer register 126 of FIGS. 3 and 5B are transferred in parallel into the various registers, upon the receipt of various shift commands, as will be described.

Figure 5B:
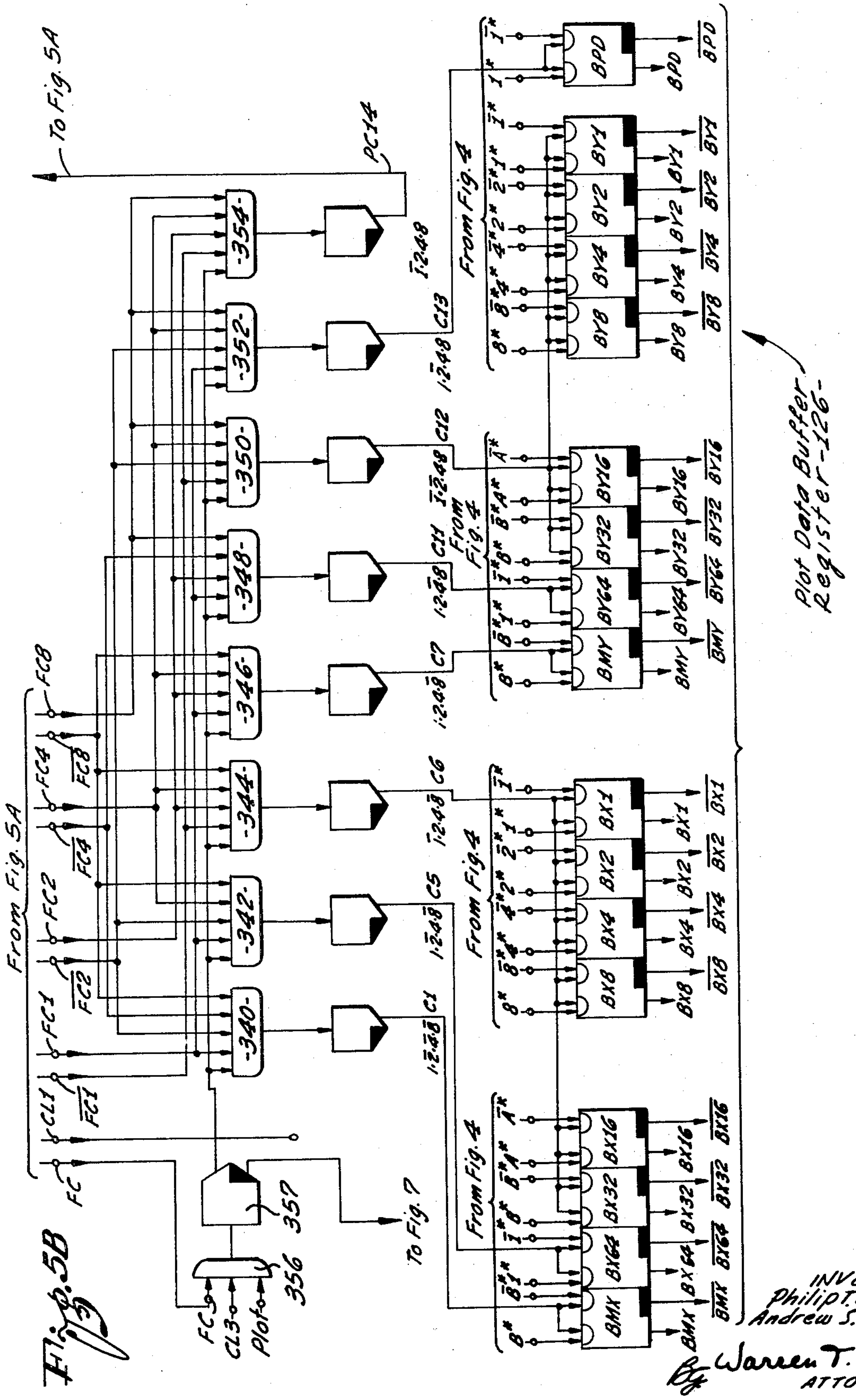
Figure 8A:
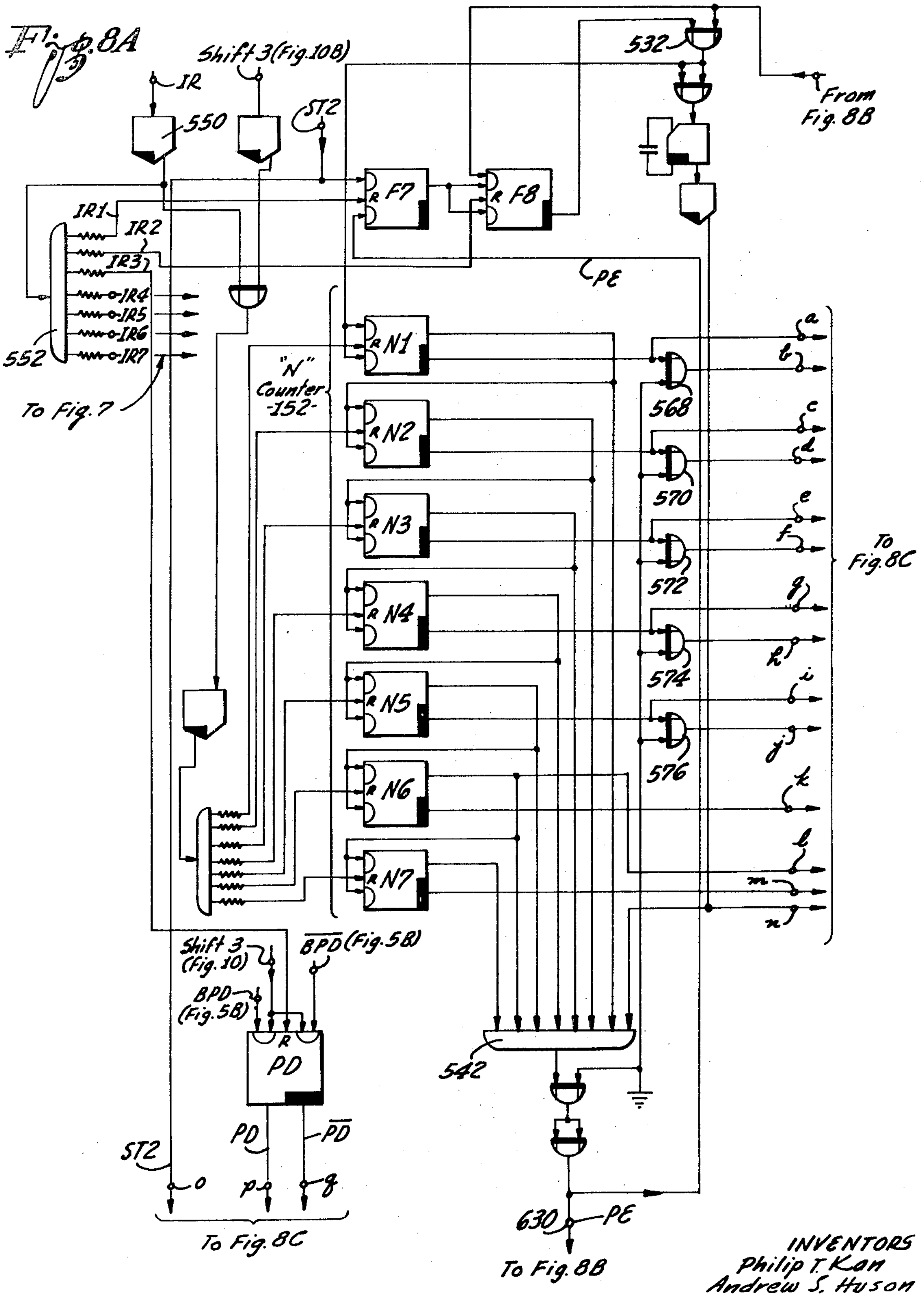
FIGS. 8A–8D are circuit diagrams and block diagrams of a delta generator which also is included in the system of FIG. 3.
Figure 8B:
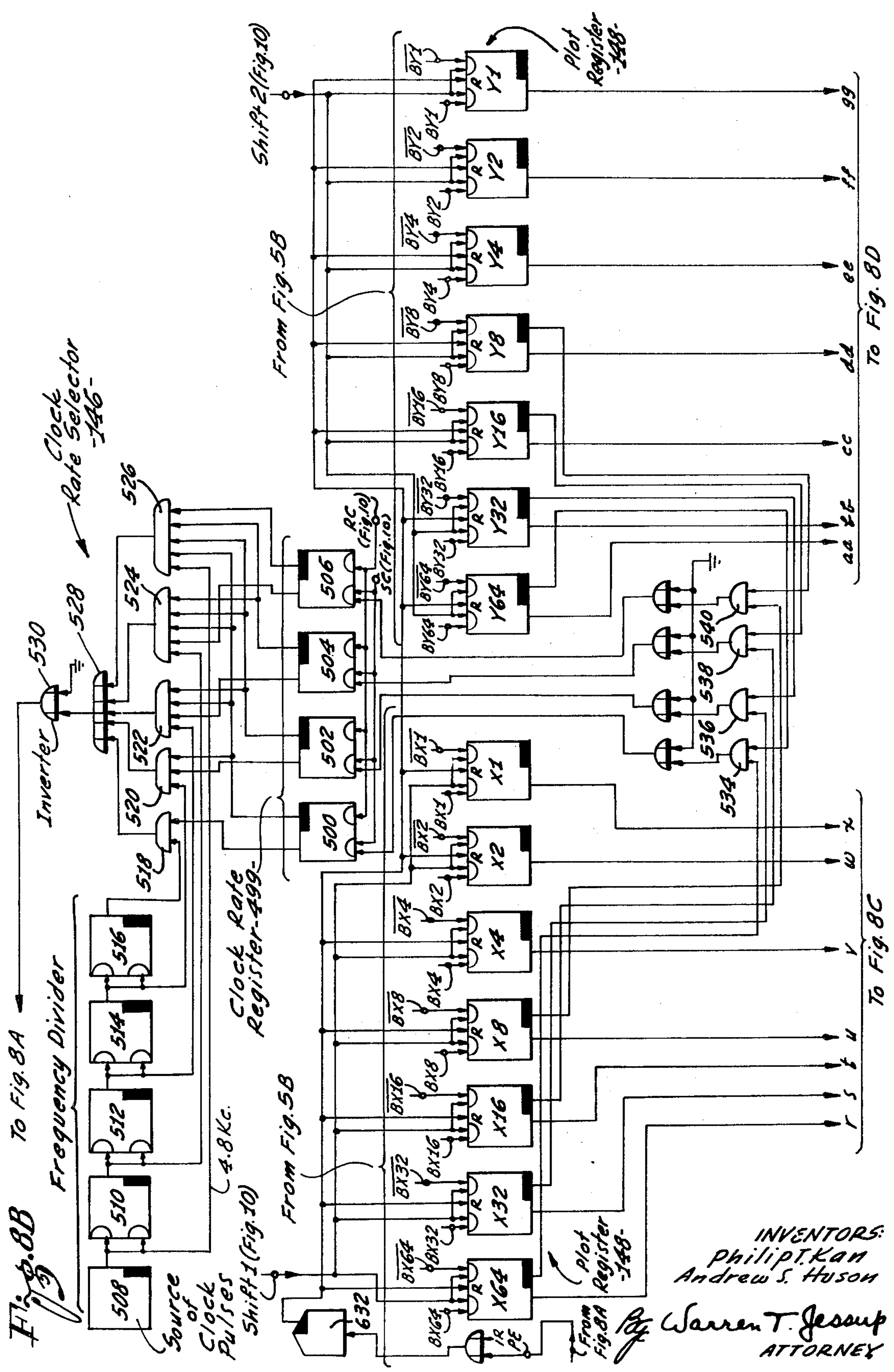

For example, a "SHIFT 1" command causes the X-instruction bits to be shifted together out of the flip-flops BX64, BX32, BX16, BX8, BX4, BX2, BX1 of the plot data buffer register 126 of FIG. 5B; into the flip-flops X64, X32, X16, X8, X4, X2 and X1 of the plot register 148 of FIG. 8B.

Likewise, a "SHIFT 2" command causes the Y-instruction bits to be shifted together out of the flip-flops BY64, BY32, BY16, BY8, BY4, BY2, BY1 of the plot data buffer register 126 of FIG. 5B; into the flip-flops Y64, Y32, Y16, Y8, Y4, Y2 and Y1 of the plot register 148 of FIG. 8B.

In the same manner a "SHIFT 3" command causes the Z-instruction to be passed from the BPD flip-flop of the plot data buffer register 126 of FIG. 5B to a PD flip-flop in FIG. 8A. It will be appreciated that when the flip-flop is set, the pen is down and marks the paper throughout the associated X- and Y-commands; but when the flip-flop PD is reset, the pen is up from the paper during the movements of the pen and paper in response to the corresponding X- and Y-commands.

Figure 8C:
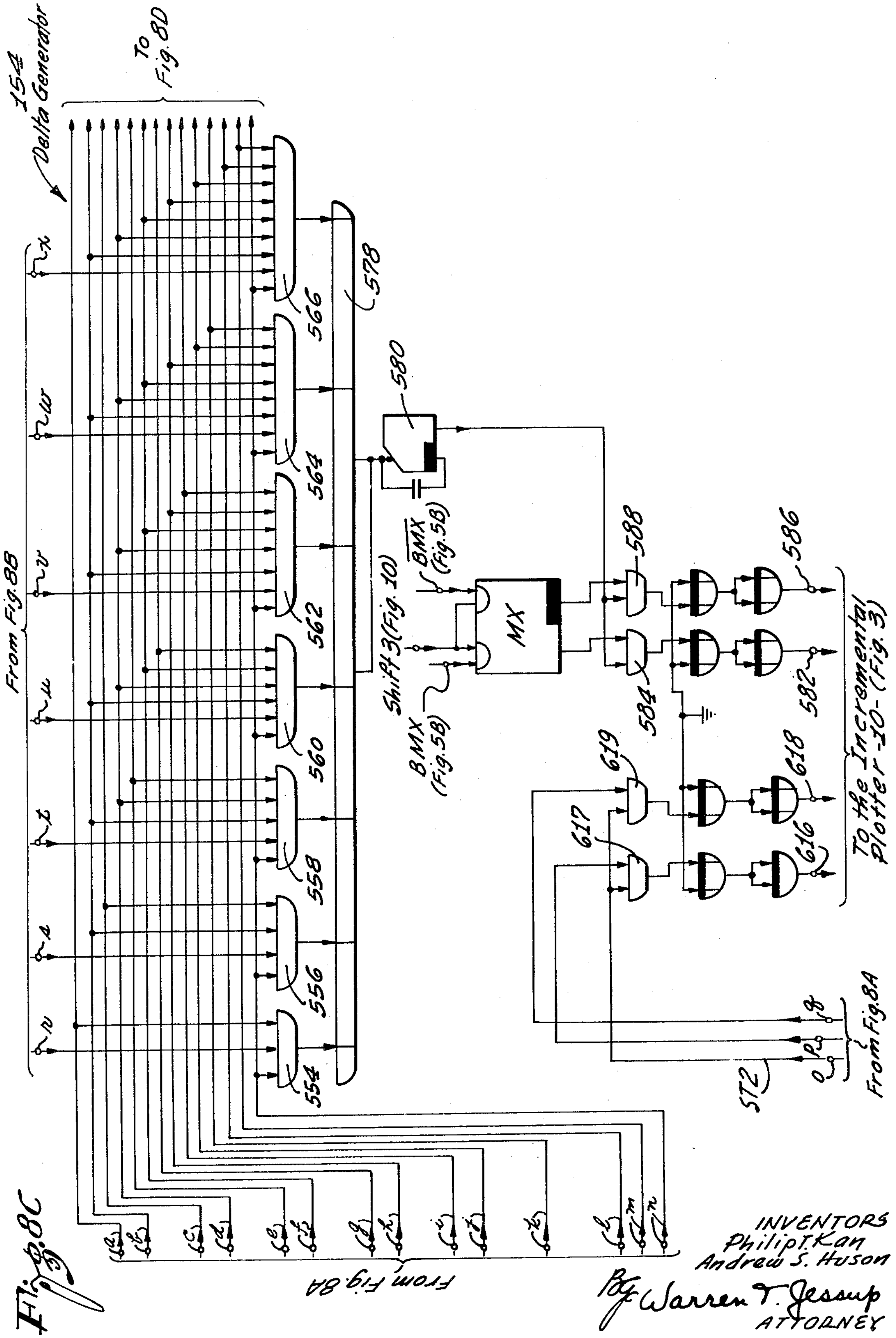
Figure 8D:
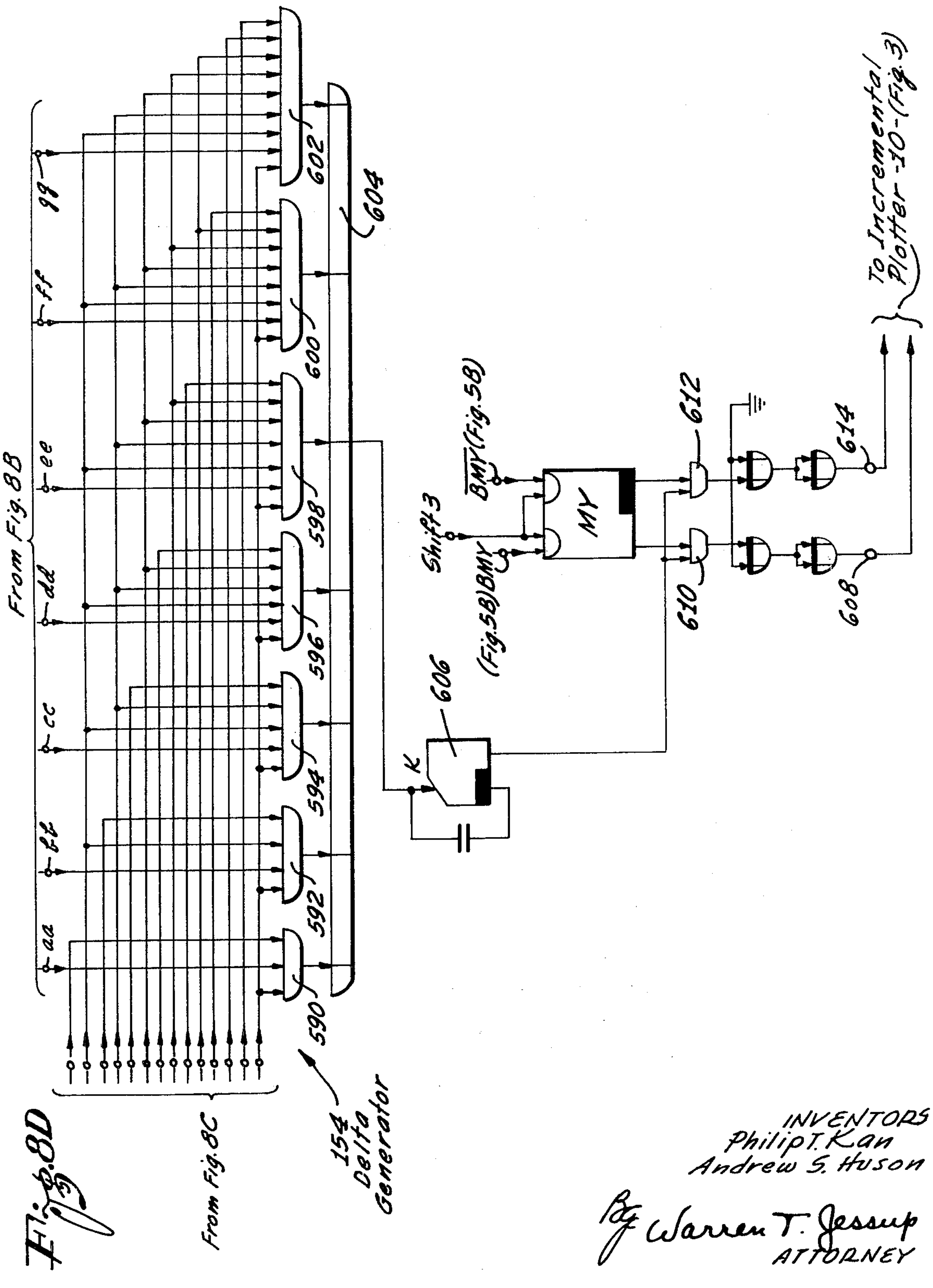

Likewise, the SHIFT 3 command causes the X-sign bit to be shifted from the buffer flip-flop BMX of FIG. 5 into a flip-flop MX in FIG. 8C; and the Y-sign bit to be shifted from the buffer flip-flop BMY of FIG. 5 into a flip-flop MY in FIG. 8D.

A clock rate register 499 is also included in the circuit of FIG. 8B, which is made up of four flip-flops 500, 502, 504, 506.

It will be remembered that an important feature of the system of the present invention is the ability for each instruction to move the incremental plotter through a predetermined number of incremental steps (for example, 0–127) as indicated by the instruction, instead of a single incremental step, as in the prior art systems.

A concomitant feature of the present system is to control the speed of movement of the incremental plotter depending upon the number of incremental steps it is to be moved in response to any particular instruction. This is achieved by providing five different plotter control clock rates and by selecting a particular rate in accordance with the number introduced into the aforesaid clock rate register 499.

A source 508 of clock pulses is provided, and this source generates clock pulses having a repetition frequency, for example, of 4.8 kilocycles. A series of frequency dividers 510, 512, 514 and 516 are coupled to the source 508; and these produce clock pulses, for example, at repetition frequencies of 2.4 kilocycles, 1.2 kilocycles, 600 cycles, and 300 cycles per second, respectively.

The clock source 508, and the frequency dividers 510, 512, 514 and 516 are respectively coupled to AND-gates 518, 520, 522, 524 and 526. These AND-gates are controlled by the register 500, 502, 504, 506, so that a particular clock rate is passed through the NOR-gate 528 and inverter 530 to the gate 532 of FIG. 8A.

The clock rate to be selected depends upon the highest number stored in the X- and Y-portions of the plot register 148 in FIG. 8B. At the outset the clock rate register 499 is reset by the introduction of a term RC to the reset input terminals of each of the flip-flops 500, 502, 504, 506. This enables the gate 526 so that the highest clock rate is applied to the gate 532.

The term SC is then applied to the flip-flops 500, 502, 504, 506 to enable them to be set in accordance with the highest number stored in the X- or Y-portion of the plot register 148. The latter setting is achieved through AND-gates 534, 536, 538 and 540 which are respectively connected to the flip-flops X64, X32, X16, X8 and Y64, Y32, Y16, Y8. In this manner, if the larger number of the two stored in either the X-portion or the Y-portion of the plot register 148 is between 32 and 63, the 2.4-kilocycles clock rate is selected and applied to the gate 532; if the number is between 16 and 31, the 1.2 kilocycle clock rate is selected and applied to the gate 532, and so on.

Only after the desired clock rate has been selected, is the term ST2 derived, as will be explained, and applied to the flip-flop F7 in FIG. 8A to set that flip-flop. The flip-flop F8 is then set by the setting of F7, enabling the gate 532, so that the selected clock rate may be applied to a flip-flop N1.

The flip-flops N1–N7 are arranged as a binary counter to constitute the N-counter 152 referred to in conjunction with FIG. 3, and when the selected clock is applied to the flip-flop N1, the counter counts through 127 steps at the rate of the applied clock. At the 127th step, the AND-gate 542 passes a pulse PE which resets the flip-flop F7, thereby disabling the gate 532 and preventing any further actuation of the counter N1–N7.

The initial, manually initiated signal IR which is derived from any suitable relay circuit, not shown, coupled to the "on" switch of the system, and which serves initially to reset the system to a predetermined state, is applied to an amplifier 550 in FIG. 8A, and is applied to a DC reset gate 552. The gate 552 generates a series of reset signals IR1–IR7 in response to the IR signal. The reset signals IR1, IR2 and IR3 are applied to the flip-flops F7, F8 and PD respectively.

When the N-counter 152 has been counted through its entire 127 steps, thereby completing the execution of the instruction in the X- and Y-sections of the plot register 148 in FIG. 8B, the gate 542 passes the pulse PE (as mentioned), which is amplified in an amplifier 632 in FIG. 8B and which serves to reset the flip-flops X1, X2, X4, X8, X16, X32, X64, Y1, Y2, Y4, Y8, Y16, Y32 and Y64. This causes the plot register 148 to be conditioned to receive the next instruction from the plot data buffer register 126 of FIG. 5 when the SHIFT 1 and SHIFT 2 terms are again produced.

As mentioned above, the SC term from the circuit of FIG. 10B sets the clock rate selector register 499 in FIG. 8B in accord with the higher number in the X- or Y-portions of the plot register 148. At the completion of the execution of the instruction, the register is reset by the term RC, likewise derived from the circuit of FIG. 10B.

The flip-flops X64, X32, X16, X8, X4, X2, X1 of the X-portion of the plot register 148 in FIG. 8B are connected to corresponding gates 554, 556, 558, 560, 562, 564, 566 in FIG. 8C. Various outputs of the N-counter 152 of FIG. 8A are also applied, as shown, to the gates. Inverter amplifiers 568, 570, 572, 574, 576 are included in some of the leads, as shown, so as to provide a desired logic relationship in the keying of the gates.

The aforesaid gates are connected through an OR-gate 578 to a one-shot multivibrator 580. The output of the one-shot multivibrator is applied to the incremental plotter 10 of FIG. 3 by way of terminal 582 (through a gate 584) for one condition of the X-sign flip-flop MX; and by way of terminal 586 (through a gate 588) for the other condition of the X-sign flip-flop MX.

In like manner, the flip-flops Y64, Y32, Y16, Y8, Y4, Y2, Y1 of the Y-portion of the plot register 148 of FIG. 8B are connected to corresponding gates 590, 592, 594, 596, 598, 600, 602 in FIG. 8D. The outputs from the N-counter 152 of FIG. 8A are also applied, as shown, to the gates by way of the portion of the circuit shown in FIG. 8C. The latter gates are connected through an OR-gate 604 to a one-shot multivibrator 606. The output of the one-shot multivibrator 606 is applied to the incremental plotter 10 of FIG. 3 by way of terminal 608 (through a gate 610) when the Y-sign flip-flop MY is in one state; and by way of terminal 614 (through a gate 612) when the Y-sign flip-flop MY is in its other state.

Figure 10A:
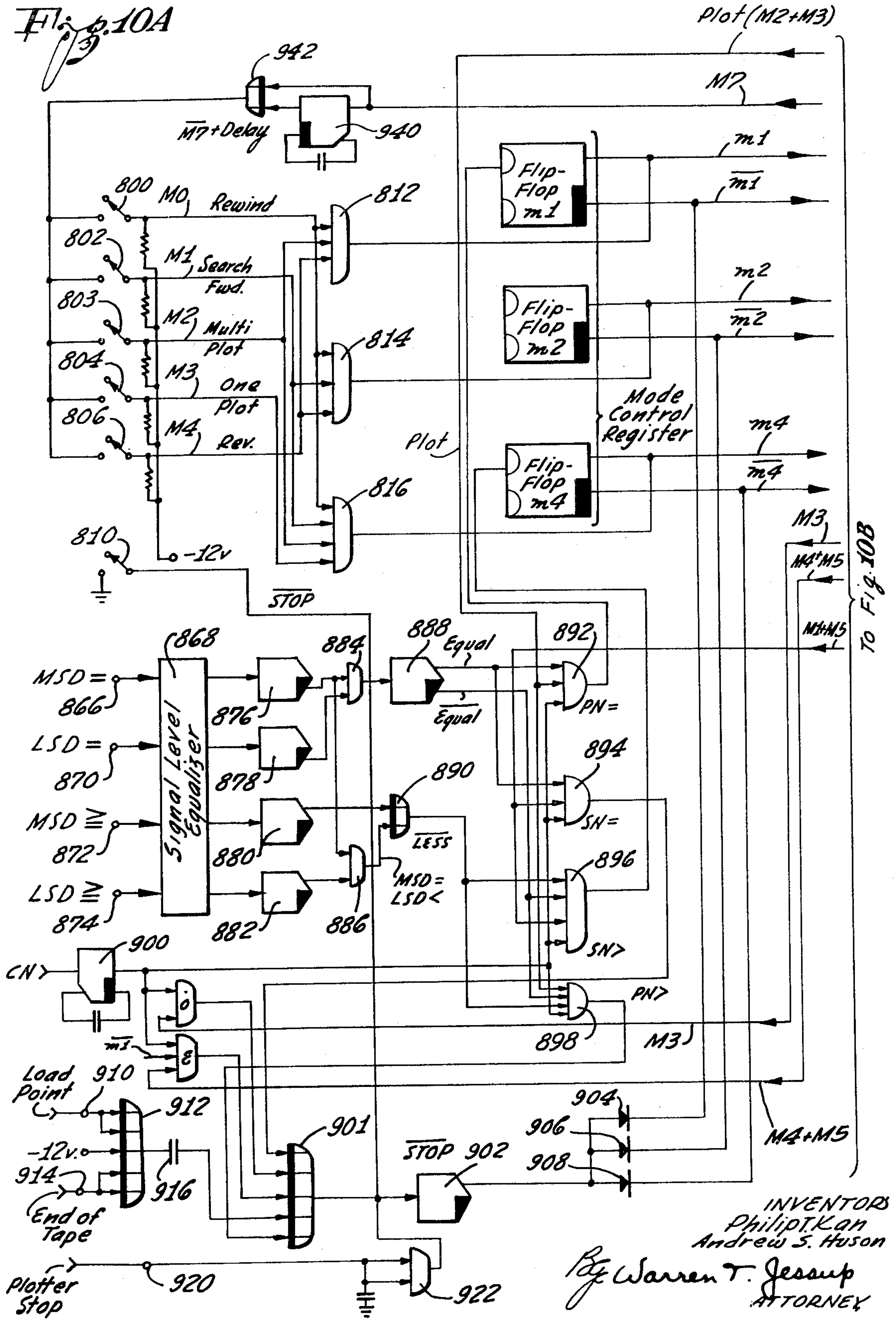
FIGS. 10A and 10B are circuit diagrams and block diagrams of certain control circuits used in the system of FIG. 3 to control a magnetic tape storage unit.
Figure 10B:
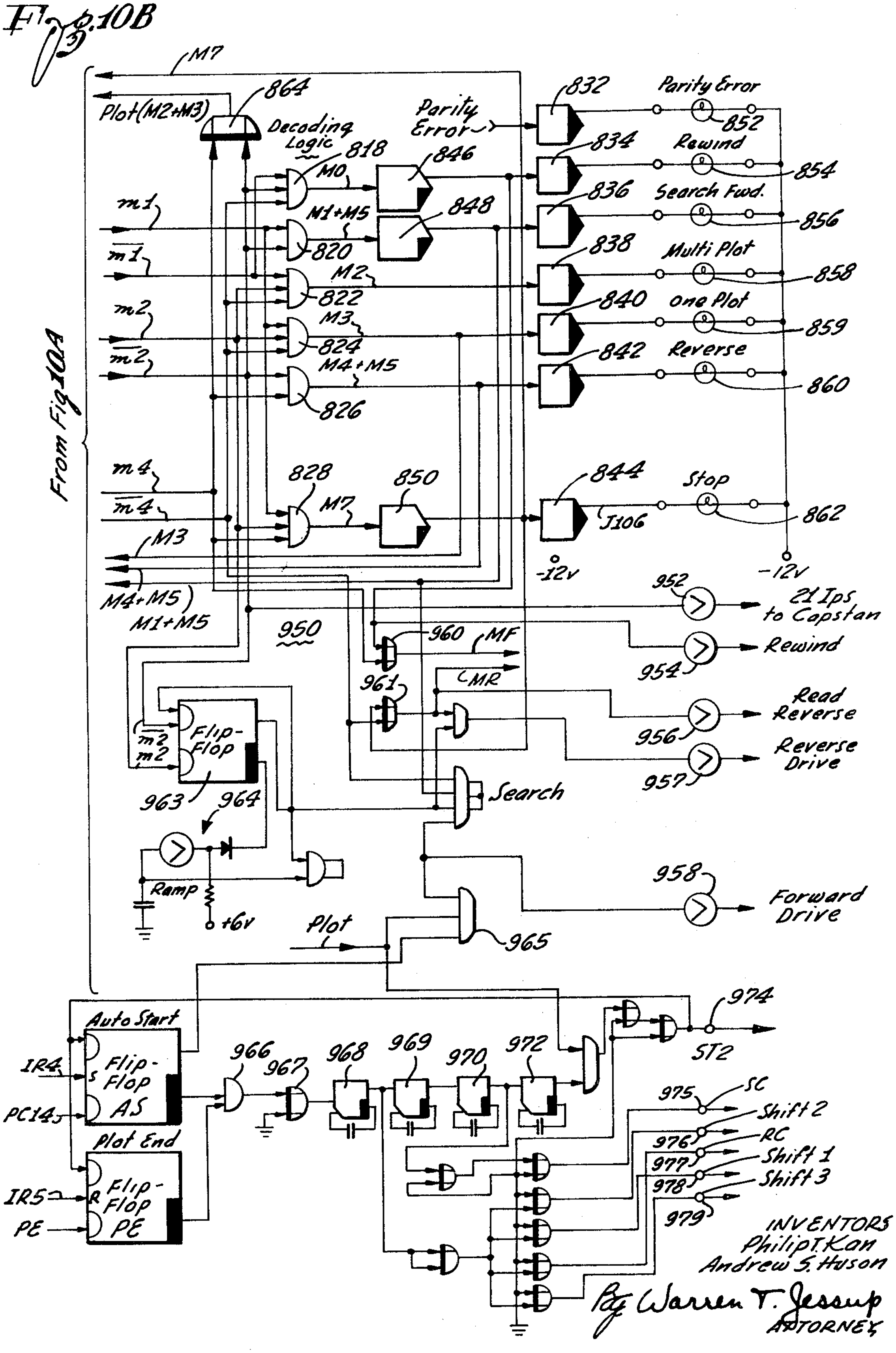

It will be appreciated that the X-command is introduced in parallel from the data buffer register 126 of FIG. 5B into the X-portion of the plot register 148 of FIG. 8B in response to the SHIFT 1 term from the circuit of FIG. 10B; the Y-command is introduced in parallel from the data buffer register 126 of FIG. 5B into the Y-portion of the plot register 148 of FIG. 8B in response to the SHIFT 2 term; and the X- and Y-sign bits are respectively shifted into the MX and MY flip-flops in FIGS. 8C and 8D in response to the SHIFT 3 term. As will be described, all three SHIFT terms are produced at the same time by the circuit of FIG. 10B.

The SHIFT 3 term derived from the circuit of FIG. 10B also serves to shift the corresponding pen instruction into the PD flip-flop of FIG. 8A. When the pen is to be "down", an output is produced at a terminal 616 of FIG. 8C through a gate 617; and when the pen is to be "up", an output is produced at a terminal 618 of FIG. 8C, through a gate 619. This occurs, however, only when the ST2 (start plot) term is produced, so as to enable the gates 617 and 619.

It has been found preferable, for practical reasons, that when there is to be a change in the pen "up" or "down" position, the Z-command should be programmed to exist alone in the entire instruction, so that there will be no simultaneous X- or Y-movements of the plotter during the "up" or "down" movements of the pen.

All the output terminals 582, 586, 608, 614, 616 and 618 are connected to the plotter 10 of FIG. 3, and the plotter responds in known manner to the signals at the output terminals to perform its incremental plot function.

After the new instruction has been shifted into the X- and Y-plot register 148 of FIG. 8B and into the MX and MY flip-flops of FIGS. 8C and 8D, as described above, in response to the SHIFT 1, 2 and 3 signals; the clock rate register 499 of FIG. 8B is set by the term SC, and the desired clock rate is selected, as determined by the greater of the X-, Y-numbers in the plot register.

The start plot pulse (ST2) is then applied to the system by way of the terminal of FIG. 8A to enable the gates 617 and 619 in FIG. 8C and to cause the control flip-flops F7 and F8 in FIG. 8A to enable the gate 532. The enabling of the gate 532 causes the N-counter 152 of FIG. 8A to be actuated at the rate of the selected clock. The N-counter is counted through its 127 steps, and the various flip-flops making up the N-counter produce the wave forms shown in the upper part of the curves of FIG. 9.

These waveforms, and their complements, control the gates 554, 556, 558, 560, 562, 564, 566 in FIG. 8C and 590, 592, 594, 596, 598, 600, 602 in FIG. 8D; so that simultaneously predetermined numbers of pulses are passed to the output terminals 582, 586 in FIG. 8C and 608, 614 in FIG. 8D, depending upon the settings of the flip-flop in the X- and Y-portions of the plot register.

The pulses passed are applied to the incremental plotter 10 of FIG. 3 to move it an incremental distance in response to each such pulse. The distance moved, of course, is +1 or −1 in the X-direction for each such pulse, depending upon the setting of the X-sign flip-flop MX of FIG. 8C, and simultaneously +1 or −1 in the Y-direction depending upon the setting of the Y-sign flip-flop MY of FIG. 8D.

As will be described, the ST2 pulse (FIG. 10B) also sets an AUTO START flip-flop and a PLOT END flip-flop. The setting of the AUTO START flip-flop will start the sensing of the tape again, so that the next instruction can be read into the plot data buffer register 126 of FIG. 5B, while the plotter is receiving X- and Y-pulses.

Figure 9:
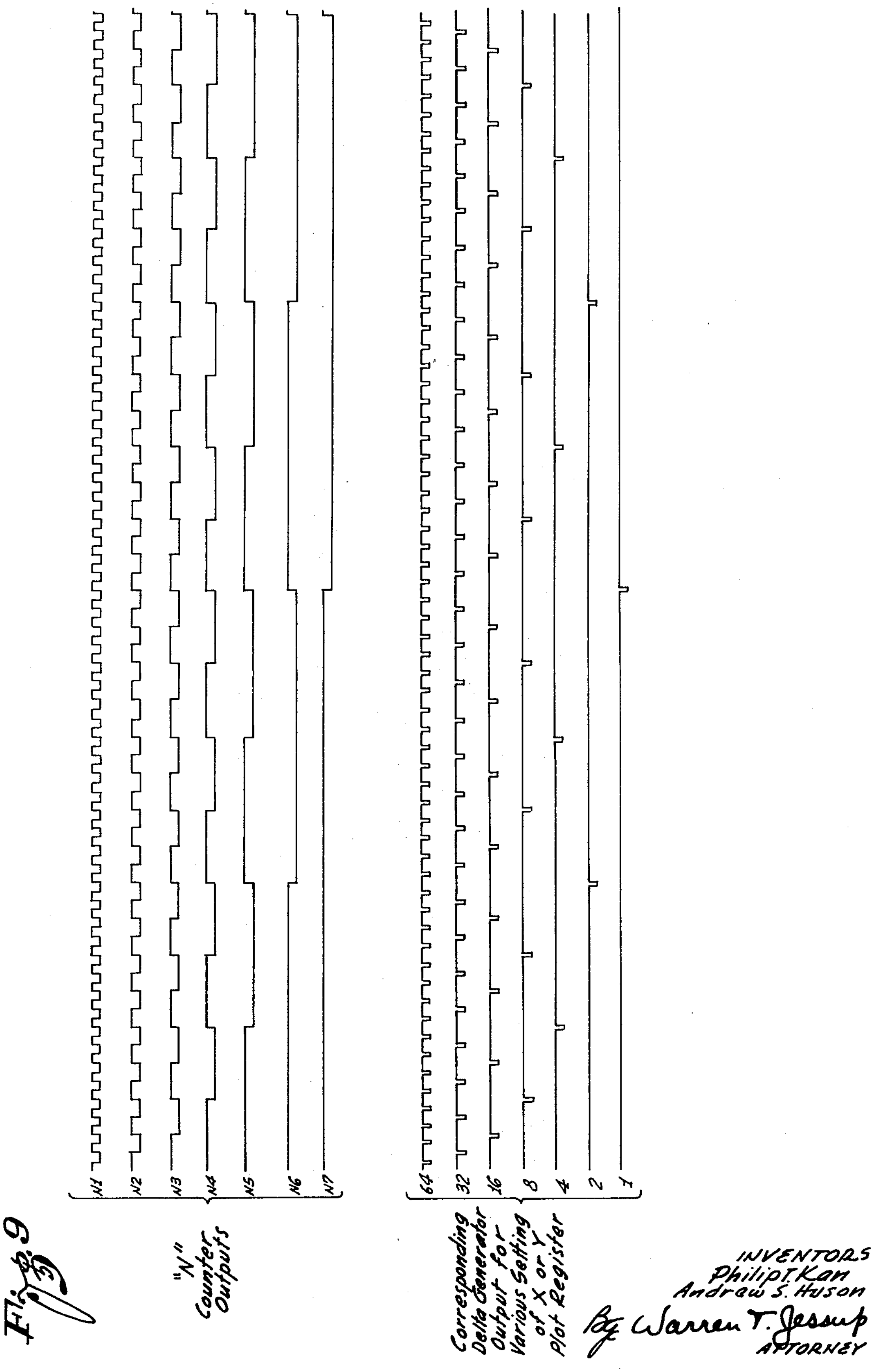
FIG. 9 is a timing diagram, useful in explaining the operation of the delta generator of FIGS. 8A–8D.

As shown in the lower part of the curves of FIG. 9, for example, if the X1 (or Y1) flip-flop alone is set, a single pulse is passed to the output, designating an X- or Y-command of "1". However, if the X-command, for example, is "65", the X64 flip-flop will also be set and 65 incremental pulses will be passed. Likewise, any desired number of pulses from 0–127 can be passed, depending upon the contents of the plot register. These numbers of course are merely by way of example and are not intended to limit the invention in any way.

Thus the pen is moved a predetermined number of incremental steps, depending upon the Y-command in the plot register 148 of FIG. 8B, and the paper is simultaneously moved a predetermined number of incremental steps, depending upon the X-command in the plot register 148. Therefore, the system can control the plotter in such a way that the plotter can draw lines of any slope upon the receipt of an appropriate instruction from the tape.

In addition an appropriate clock rate is automatically selected, as described above, so that plot speed is maximized to the highest practical speed for each command.

After the execution of each plot instruction, the N-counter 152 of FIG. 8A completes its count and the signal PE (plot end) is produced at the output terminal 630, as noted above. This term signifies that the plotter is ready to plot again. Therefore, it resets the PLOT END flip-flop of FIG. 10B and generates the RC, SHIFT, SC and ST2 pulses. The signal PE is also applied through the amplifier 632 to the flip-flops of the plot register 148 of FIG. 8B, so that they may all be reset and ready to receive the next instruction. The signal RC is also applied to the clock rate selector register 500, 502, 504, 506, to return that register to its zero condition.

The circuit of FIGS. 10A and 10B is used to control the tape storage unit, and other parts of the system, as will be described. These controls originate, for example, in a series of manually operated pushbutton switches 800, 802, 803, 804, 806 and 810. The switch 800, for example, causes the tape storage unit to rewind, when that switch is depressed to its closed position and released. Likewise, the switch 802 causes the magnetic tape storage unit to search in the forward direction, whereas the switch 810 causes the system to stop. The pushbutton switch 803, when depressed, places the system in the multiplot mode, whereas the pushbutton switch 804, when depressed, places the system in the single plot mode. The pushbutton switch 806, when depressed, places the system in the reverse mode.

The pushbutton switches 800, 802, 803, 804, 806 and 810 are connected through a group of AND-gates 812, 814 and 816 to a series of flip-flops *m*1, *m*2 and *m*4. The flip-flops *m*1, *m*2 and *m*4 form a mode control register, and they are established in a different pattern of settings, depending upon which of the aforesaid switches 800, 802, 803, 804 and 806 is closed.

The outputs from the flip-flops *m*1, *m*2 and *m*4 are applied to a series of AND-gates 818, 820, 822, 824, 826 and 828 in FIG. 10B. These -ND-gates are connected to constitute decoding logic circuitry, and a predetermined signal level is developed on the corresponding output leads of the decoding logic circuitry, depending upon the mode of operation in which the system is placed by the aforesaid switches. The decoding logic circuitry also develops the "plot" signal ($m2+m3$) through a NOR gate 864.

The various modes of operation are established in accordance with the following table:

| | Modes of Operation | Speed-Inches per Second |
|---|---|---|
| MO | Rewind | 168 |
| M1 | Search forward | 21.6 |
| M2 | Multiplot | 2.16 |
| M3 | One plot | 2.16 |
| M4 | Reverse | 21.6 |
| M5 | Search Reverse | 21.6 |
| M7 | Stop | |

The various outputs from the aforementioned decoding logic circuitry, together with the parity error signal from the circuit of FIG. 7 are applied to a corresponding series of lamp driver circuits designated respectively 832, 834, 836, 838, 840, 842 and 844. Additional amplifiers 846, 848 and 850 are interposed before the respective drivers 834, 836 and 844. As shown, the lamp drivers are connected to respective indicating lamps 852, 854, 856, 858, 859, 860 and 862 which indicate respectively "parity error", and whether the system is in the "rewind", "search forward", "multi-plot", "one plot", "reverse " or "stop" mode.

The address comparator 132 in FIG. 3 responds to the most significant (or tens) decimal digit of the address currently applied, for example, to the Nixie display tube 325 in FIG. 6, and it also responds to the least significant (or units) decimal digit currently supplied to the Nixie tube 328 in FIG. 6; these digits being compared in the comparator with the corresponding digits of the desired address, as selected by the address switches 130 in FIG. 3.

Whenever an equality is achieved in the comparator between the most significant digits of the current address and desired address, a predetermined signal level is established on the lead 866 in FIG. 10A, which is connected to a signal level equalizer circuit 868. Likewise, when equality between the least significant digits of the current address and the desired address is detected in the comparator, a predetermined signal level is applied by way of the lead 870 to the circuit 868. On the other hand, when the indication is that the most significant digit of the current address is greater than that of the desired address, a predetermined signal level is established on the lead 872 in FIG. 10A. Likewise, when the least significant digit of the current address is greater than the least significant digit of the desired address, a predetermined signal level is established on the lead 874 in FIG. 10A.

The circuit 868 applies the various signals received by it to a set of amplifiers 876, 878, 880 and 882. These amplifiers, in turn, are connected to a pair of AND-gates 884 and 886. The AND-gate 884 is connected to an amplifier 888 which develops a predetermined signal level at one of its output terminals when full equality exists between the current address and desired address, and establishes the predetermined signal level at its complemented output terminal when no such equality exists.

The amplifier 880 and AND-gate 886 are also connected to a NOR-gate 890, and the NOR-gate develops a predetermined signal level at its output when the current address is greater than the desired address. The outputs from the amplifier 888 and NOR-gate 890 are applied to a set of AND-gates 892, 894, 896, 898. These AND-gates are timed by a pulse derived from a one-shot multivibrator 900 which, in turn, is triggered by a pulse CN. The pulse CN is derived from the address character counter FS4 in FIG. 5A, and is timed to occur after the corresponding digit of the current address is actually in the address register 122 of FIG. 6.

It will be observed that the plot term (M2+M3) is applied to the AND-gates 892 and 898, so that these AND-gates are enabled only during the plot mode. The AND-gate 894 develops ac-an output during the search mode when equality is reached between the current address and the desired address. The output from the AND-gate 894 is applied through a NOR-gate 901 and an amplifier 902, and through isolating diodes 904, 906, 908 to the various flip-flops $m1$, $m2$, $m4$, so as to set the system to the stop mode (M7).

Therefore, when equality is detected in the comparator 132 of FIG. 3 between the current address and the desired address during the search mode, the system is stopped. It will be remembered, that the system is then put into operation, by the operator pressing the plot button, so as to establish the plot mode. That is, he would close either switch 803 for multiplot or close switch 804 for one plot. It will also be remembered that during the search mode, the system initially moves to the first address, which is compared with the desired address. Then, if the current address is greater than the desired address, the tape reverses, and scans to the desired address in the opposite direction which, by reason of the comparison, it known to be the shortest distance to the desired address.

This latter control is initiated by an output generated by the AND-gate 896. The AND-gate 896 generates that output when the first address to be compared is found to be greater than the desired address, and the output sets the flip-flop $m4$. The system then searches in the reverse direction (M5) until address equality is reached, at which time the AND-gate 894 develops an output, which stops the system, as described above.

As mentioned above, the AND-gate 892 develops an output when the system is in the plot mode, and when address equality is reached. This output changes the system to the "one plot" mode, by setting the flip-flop $m1$. That is, if the system had been set to the multiplot mode, it would continue to plot through one group of instructions to the next, until a particular address was reached. At that time, address equality would be achieved, so that the AND-gate 892 would develop an output which, in turn, would set the system to the one-plot mode, so that the system would automatically stop plotting at the end of the following group of instructions.

The AND-gate 898 is included to provide an automatic stop whenever, during the plot mode, the current tape address is greater than the desired switch address.

The tape used in the magnetic tape storage unit 12 of FIG. 1 is usually equipped with a detector which senses the beginning and end of the tape. When the beginning of the tape is sensed, a predetermined signal level is established on the lead 910 connected to a NOR-gate 912, and when the end of tape is detected, a predetermined voltage level is established on a lead 914 connected to the NOR-gate. The NOR-gate 912 is coupled through a capacitor 916 to the NOR-gate 901.

The connections are such that when the system is first started, it will move automatically to the load point of the tape and then stop. Further action must then be taken to place the system in operation, such as depressing one of the pushbutton switches described above. Then, the system will proceed to operate until the end of the tape is reached, at which time it will automatically stop. The plotter itself is also capable of stopping the system, by developing a predetermined voltage level on a lead 920, the latter lead being coupled through an AND-gate 922 to the input of the amplifier 902.

The stop signal M7 is also applied to a one-shot multivibrator 940 in FIG. 10A and is applied, together with the output from the one-shot multivibrator through a NOR-gate 942, to the terminals of the switches 800, 802, 803, 804 and 806. The circuit is such that the system cannot be set to any of its modes unless it is first in its stop mode. The one-shot multivibrator provides a delay, so that when any one of the switches is operated, a "race" condition does not arise and the flip-flops $m1$–$m4$ will, in each instance, be properly set or reset.

The various mode control register flip-flops $m1$, $m2$ and $m4$ are also connected through logic control circuitry designated generally as 950 to a series of emitter followers 952, 954, 956, 957 and 958. The emitter followers apply appropriate control signals to the tape transport of the magnetic tape unit 12 of FIGS. 1 and 3. For example, the emitter follower 952, under the corresponding mode control conditions $\overline{(m2)}$, passes a control voltage to the magnetic tape storage unit 12, so that it will move forward at the desired tape speed of 21.6 inches per second for search purposes.

Likewise, the emitter follower 954 applies a control voltage to the tape transport 12 during the M0 mode, so that the tape transport will perform a rewind operation. The emitter follower 957 responds during the M4 reverse mode to drive the tape transport in the reverse direction. The emitter follower 958 responds during the search or the plot modes to drive the tape forward.

When the tape transport is moving in the forward direction, a NOR-gate 960 in the circuitry 950 of FIG. 10B develops a signal level MF which, as described, is utilized in the circuit of FIG. 5A to control certain logic gates. Likewise, a NOR-gate 961 in the logic circuitry 950 develops a voltage level MR when the tape transport is moving in the reverse direction which, likewise, is utilized by the circuitry of FIG. 5A.

A flip-flop 963 is included in the circuitry 950, and this flip-flop in conjunction with a ramp generating circuit 964 provides an automatic delay of, for example, 5 seconds. This delay is effective when the mode is changed from, for example, M7 to M1 or M7 to M4, and provides time for the tape transport to come up to a fast speed, before the sensing circuitry itself is activated.

A pair of flip -flops AS (automatic start) and PE (plot end) are also included in the circuitry of FIG. 10B. The flip-flop AS is set by the IR4 pulse derived from the reset gate 552 of FIG. 8A, and the flip-flop PE is reset by the IR5 pulse derived at the same time from that gate. When the system is first turned on, an IR pulse is derived, and this is applied to the gate 552 in FIG. 8A. The resulting IR4 and IR5 pulses set and reset the flip-flops AS and PE respectively. The setting of the flip-flop AS enables the AND-gate 965 in the control circuitry 950, so as to permit the tape transport to be set to the forward drive condition during the plot modes.

This condition continues until PC14 time, at which all the information is in the plot data buffer register 126 of FIG. 3, and is ready to be shifted over to the plot register 148. At this time, the PC14 timing pulse resets the flip-flop AS which, in turn, causes the tape transport to come to a stop. The resetting of the flip-flop AS enables the AND-gate 966 which is connected to the reset output terminal of the flip-flop. At the termination of the count of the N-counter of FIG. 8A, indicating that the information in the plot register 148 of FIG. 3 has all been used to control the incremental plotter 10, a pulse PE is generated by the circuitry of FIG. 8A, and this pulse resets the flip-flop PE.

The output of the AND-gate 966 when the flip-flop PE is reset is inverted in an inverter 967, and the resulting pulse from the inverter triggers successively a chain of one-shot multivibrators 968, 969, 970 and 972. As illustrated, the outputs of the one-shot multivibrators are passed through appropriate inverters to respective output terminals 974, 975, 976, 977, 978 and 979, so that the various shift pulses SHIFT 1, SHIFT 2, SHIFT 3 may be generated to shift the contents of the buffer register 126 into the plot data register 148. Also, the timing pulses SC and RC are generated, these being utilized in the manner described above. The output terminal 974 generates, at the end of the cycle, the pulse ST2 which, likewise, is used in the manner described above. The term ST2 is also applied to the flip-flops AS and PE to set the flip-flops, so that the cycle may be reinitiated.

Figure 11:
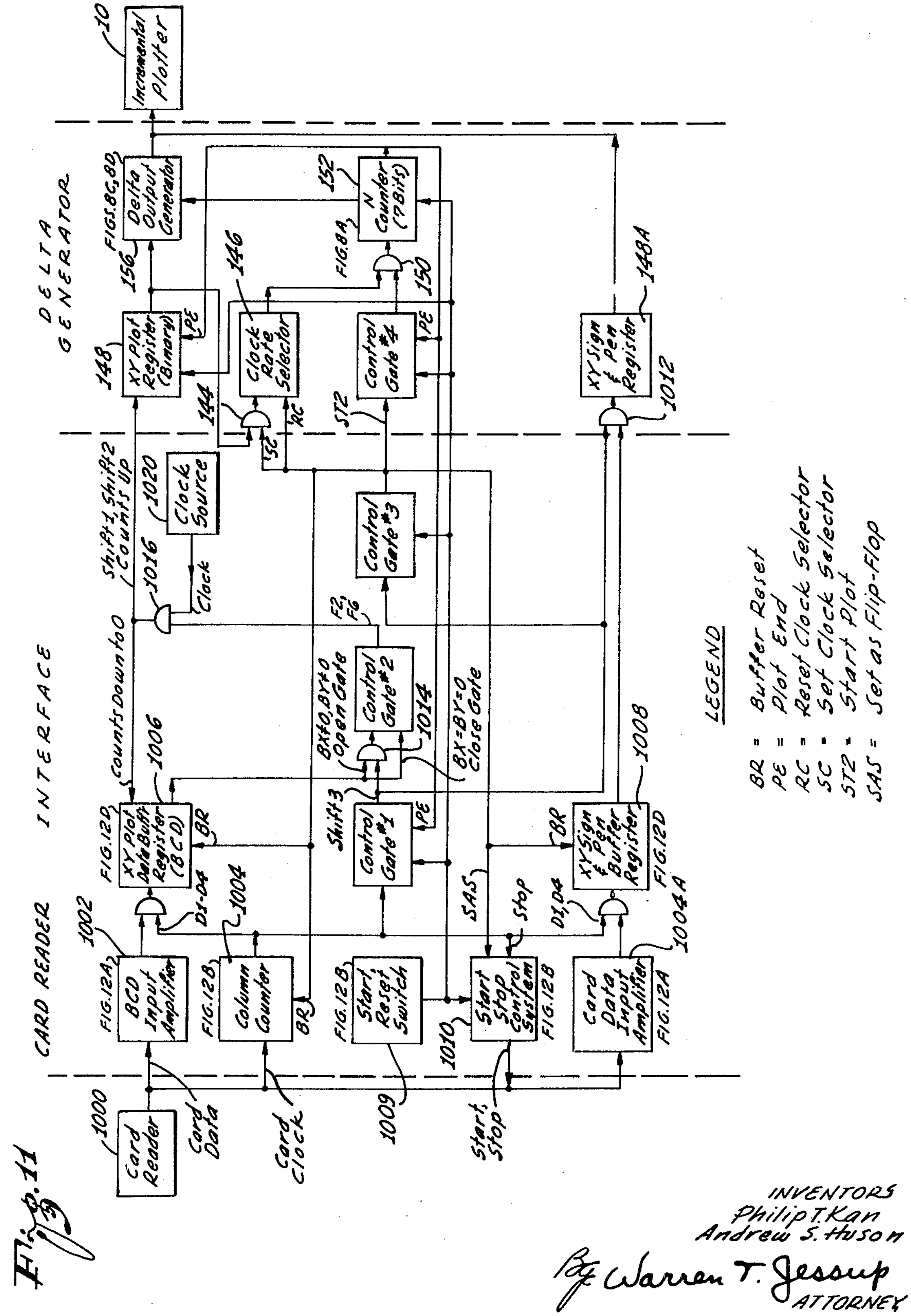
FIG. 11 is a block diagram of a system representative of a second embodiment of the invention.

In the embodiment of the invention described above the information is stored on a magnetic tape, as shown in FIG. 2A. The information, however, may be stored on usual types of punched cards, and the block diagram of FIG. 11 shows how the system of the invention may be modified to accept information and instructions from a punched card reader 1,000.

Figure 13:
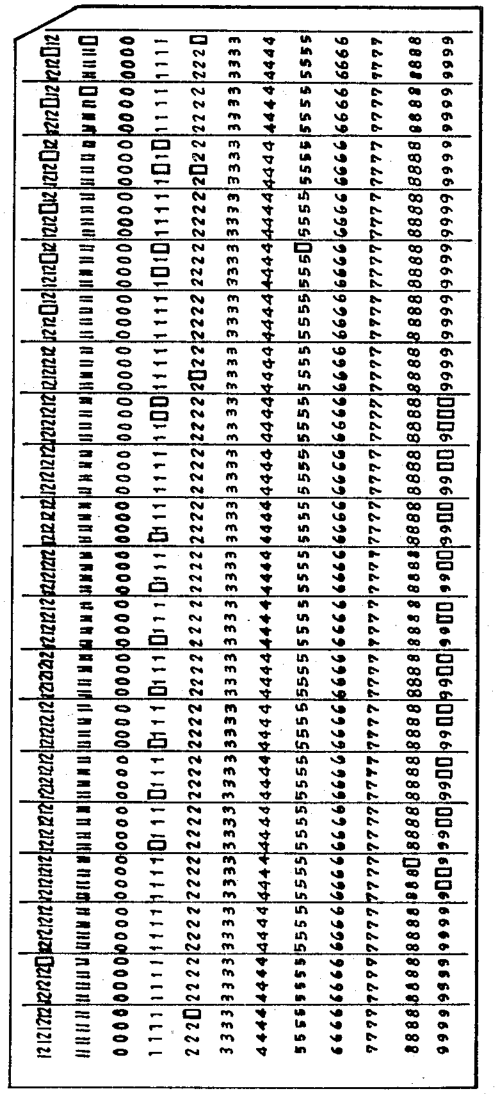
FIG. 13 is a representation of a usual punched card on which the information may be stored.

The card itself may have the configuration shown in FIG. 13. As is usual in cards of this type, it is divided into a series of rows and columns. The rows extend along the care, and 12 such rows are used in the present instance. The columns may be divided in groups of four for each full instruction, with each four columns forming a "field" on the card.

When the card is moved into a reading position in a usual card reader 1,000, the card is controlled by the system of the invention to step through four columns, with each column being read in succession. The card is then stopped until the SAS-signal from the system causes the next four columns to be successively read. It is customary for the first four column field of each card to contain information identifying that card, so that the cards can be sequenced in the proper order.

The information making up each instruction is stored in the corresponding four columns of each of the four-column fields following the first four-column field on the card, and in accordance with a preestablished table. That is, a punch in any one of rows 1–9 in the first column of each field represents the tens digit of the X-command, and a punch in any one of the 1–9 rows of the second column of each field represents the units digit of the X-command. A punch in the eleventh row of the second column means the X-command is negative. On the other hand, when there is no punch in the eleventh row of the second column, it means that the sign of the X-command is plus. In like manner, the tens and units digits of the Y-command are disposed in the third and fourth columns, respectively, of each field. A punch in the eleventh row of the fourth column means the Y-command is negative. When there is no punch in the eleventh row of the fourth column, it means the sign of the Y-command is plus. A punch in row 12 of the third column means a "pen down" condition. Likewise, when there is no punch in row 12 of the third column, it means a "pen up" condition. As before, if the pen up or down command changes, the X- and Y-commands for that instruction are made zero. A punch in row 0 is used as a system command "-halt" indication.

A conventional binary code decimal translator (not shown) is included in the card reader 1000 of FIG. 11. As the rows 1–9 of each column on the card are read by the card reader, the binary coded decimal signal levels corresponding to the X- and Y-command decimal digits represented by the punches in those columns will be applied to the system and amplified by an amplifier 1002.

At the same time the presence or absence of a sign-indicating punch in row 11 of the column being sensed will establish a corresponding signal level at the input of an amplifier 1004A; and the presence or absence of a pen command punch in row 12 of the column being sensed will establish a corresponding signal level at the input of the amplifier 1004A. Likewise, the presence or absence of a punch at the zero row of the column being sensed will also establish a corresponding signal level at the input of the amplifier 1004A. It will be appreciated that the various components shown in block form in the block diagram of FIG. 11 will be described in more detail subsequently in conjunction with FIGS. 12A–12E.

The system also includes a column counter 1004. This counter responds to clock pulses derived from the card reader 1000 to produce column counting timing pulses D1, D2, D3 and D4, as each individual column of the successive four-column fields is sensed by the reader. These timing pulses are used, in a manner to be described, to control an X-, Y-Plot Data buffer register 1006, and an X-, Y-Sign and Pen Buffer Register 1008, so that all the information of each four-column field of the card may be stored in the buffer registers 1006 and 1008 as the columns are successively sensed in the card reader.

The control system of FIG. 11 also includes start and reset switches, as represented by the block 1009, and a start-stop control system as represented by the block 1010. The start-stop control system, as will be described in more detail in conjunction with FIG. 12B, controls the operation of the card reader 1000. After the fourth column of each field of the card of FIG. 13 has been sensed, the column counter 1004 generates the pulse D3 which is applied to the start-stop control system 1010 and which stops the card reader. When the SAS-pulse is generated, the control system 1010 starts the reader again, so that each column of the next field may be successively sensed, and the cycle is repeated.

When the contents of any particular four-column field of the card being sensed by the card reader 1000 is stored in the buffer registers 1006 and 1008, a control gate No. 1 produces the "Shift 3" pulse which shifts the contents of the register 1008 through a gate 1012 into the X-, Y-Sign and Pen register 148A of the delta generator portion of the system. The Shift 3 pulse is also applied to an AND-gate 1014 which is enabled when information is in the buffer 1006. Therefore, the Shift 3 pulse is passed through a control gate No. 2 to enable an AND-gate 1016, and also to a control gate No. 3.

A clock signal is derived from a source 1020, and this clock is passed through the gate 1016 to count the buffer 1006 down to zero. This constitutes a convenient way for transferring the binary coded decimal data in the buffer 1006 serially into the X-, Y-plot register 148 in which the information is stored in binary form. This transfer is in the form of the passage of the clock pulses from the source 1020 to the X-, Y-register to count the register up to a particular setting. At the same time, the buffer register is counted to zero. When the buffer register reaches zero, the control gate No. 2 is closed, so that the gate 1016 is disabled. This terminates the count of the X-, Y-plot register 148, so that it is established in a binary setting, corresponding to the binary coded information stored in the buffer register 1006. This action will be described in more detail subsequently herein and in conjunction with FIGS. 12A–12E.

It will be remembered that there is no movement of the plotter during a pen change condition. The control gate No. 3 first generates the pulse RC to reset the clock selector 146, as described previously herein, and it also generates the buffer reset pulse BR which not only resets the buffers 1006 and 1008, but also resets the column counter 1004 (as mentioned above).

The BR-pulse then develops the term SC to set the clock rate selector 146 so that a particular clock rate will be selected, in the manner described above. It then develops the pulse ST2, which is applied through the control gate No. 4 to the N-counter 152 to start the plot. When the plot is completed, the PE-pulse, which is produced by the N-counter, resets the control gates No. 1 and No. 4.

Also at ST2 time the SAS-pulse is sent to the start-stop control system 1010 to activate the card reader to read the next four-column field of information while the N-counter is counting.

Figures 12A, 12B:
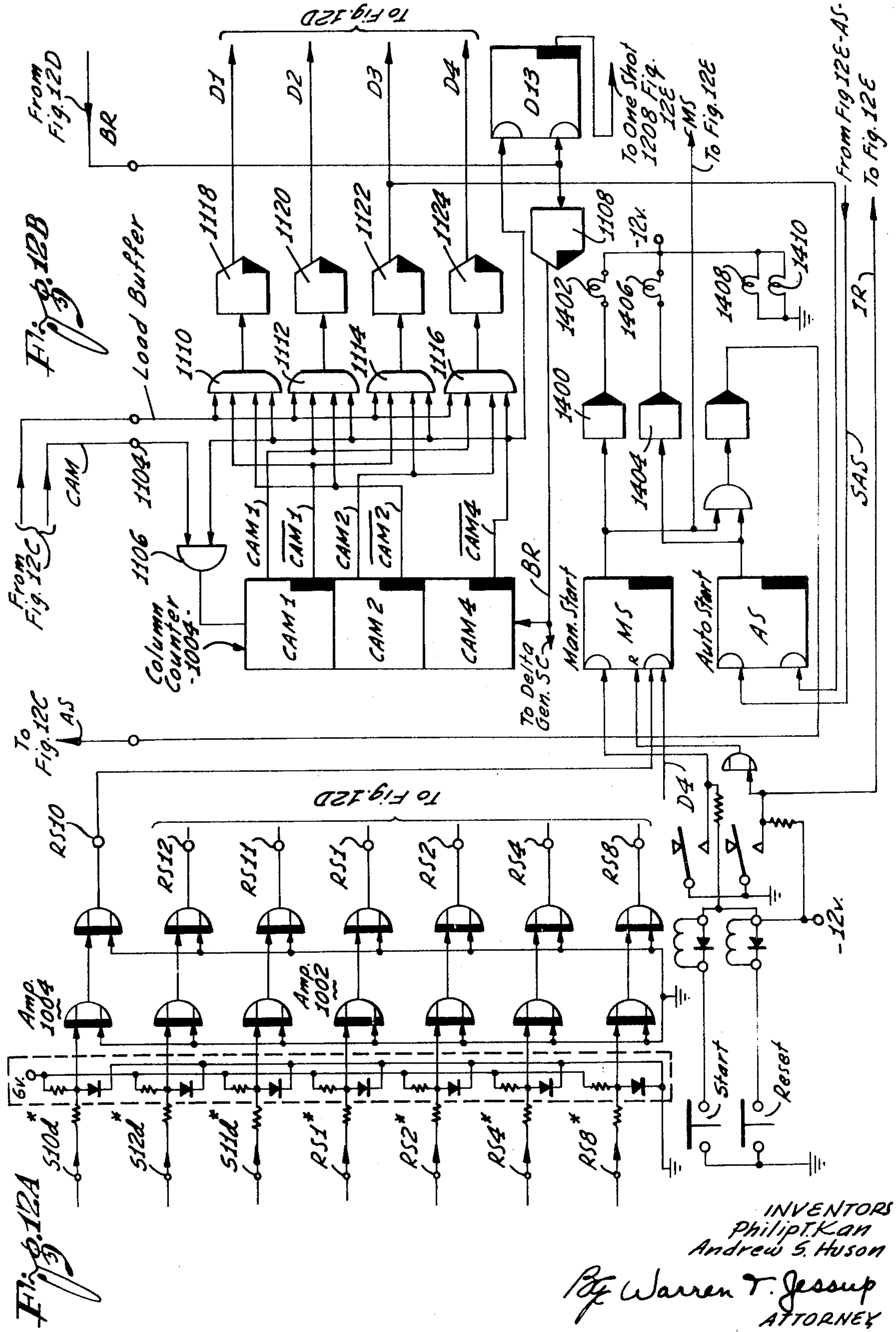
FIGS. 12A–12E are circuit diagrams and block diagrams of a modified version of a portion of the system of FIG. 3 in which the delta instructions are stored on cards, rather than on a magnetic tape as in a previous embodiment.

The details of the BCD input amplifier 1002 and the Card Data input amplifier 1004A are shown in FIG. 12A. The amplifier 1002 has four input terminals designated RS1*, RS2*, RS4* and RS8*. The Card Data amplifier 1004, on the other hand, has three input terminals designated S10d*, S12d* and S11d*.

It will be appreciated, therefore, that as each column on the card is read by the card reader 1000, the binary coded decimal signals corresponding to the decimal digit represented by that column will be applied to the input terminals RS1*, RS2*, RS4* and RS8*. At the same time, the sign of X or Y is indicated by the presence or absence of a punch in row 11 of the column being sensed will establish a corresponding signal level at the input terminal S11d*; and the pen command, as indicated by the presence or absence of a punch in row 12 of the column being sensed will establish a corresponding signal level at the input terminal S12d*. Likewise, the presence or absence of a punch at row 0 of the column being sensed will also establish a corresponding signal level at the input terminal S10d*.

The amplifier 1002, as shown in FIG. 12A, is connected in usual manner, as is the amplifier 1004. Both the amplifiers are made up of inverters which are interposed between the above-identified input terminals and corresponding output terminals. The amplifier 1002 has output terminals RS1, RS2, RS4 and RS8, whereas the amplifier 1004 has output terminals RS11, RS12 and RS10.

Figure 12C:
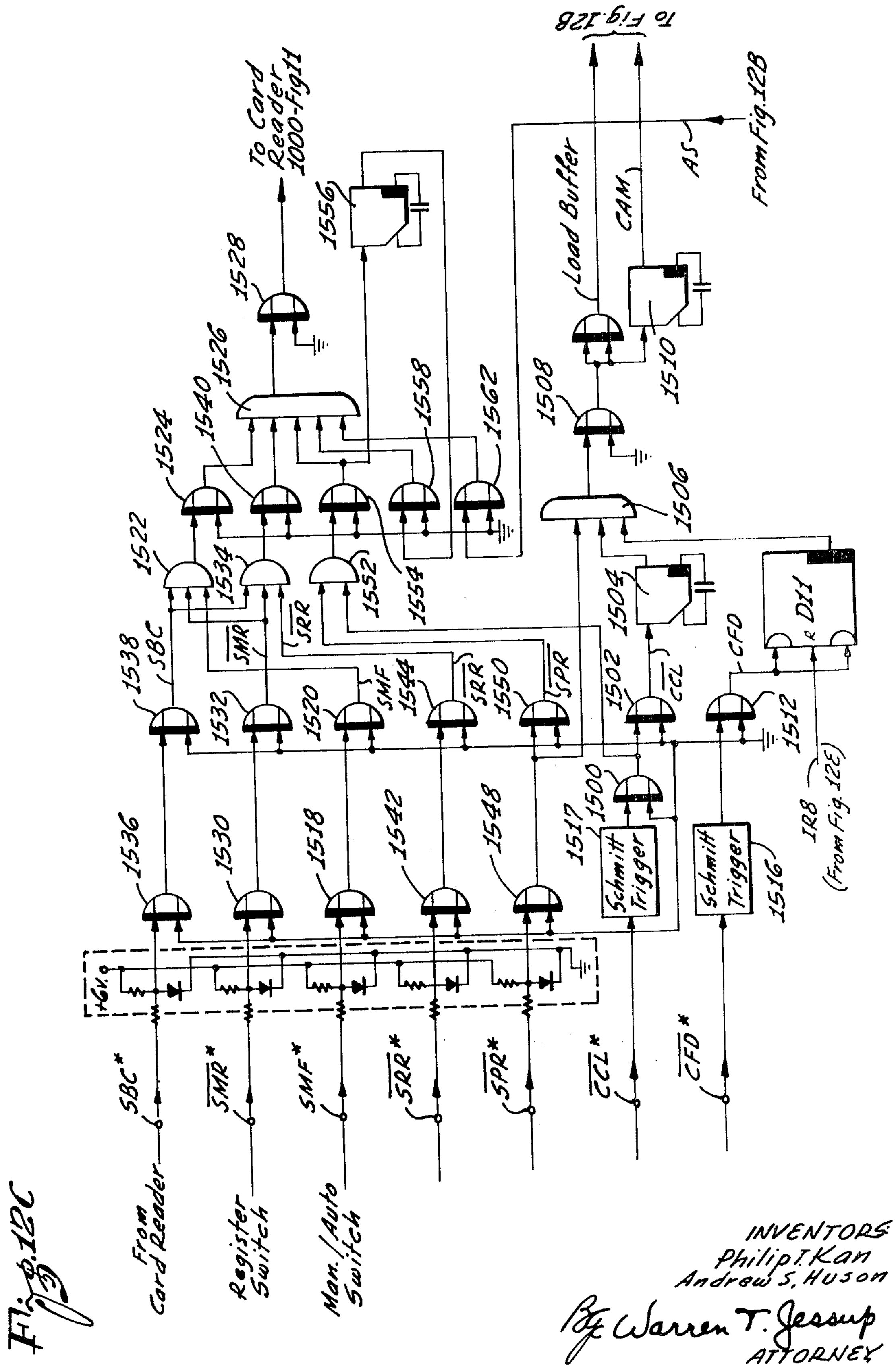
Figure 12D:
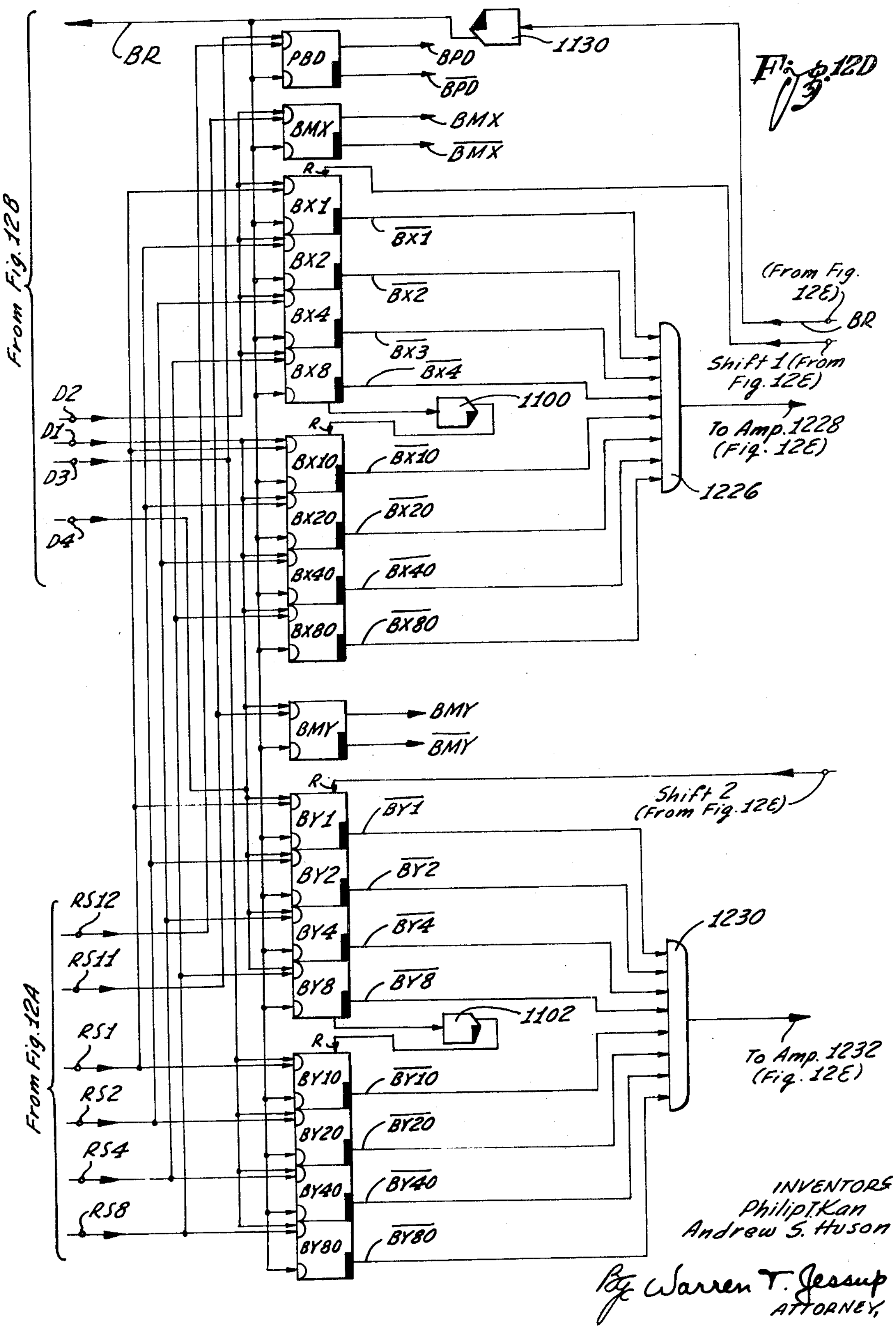

The X-, Y-Plot Data buffer register 1006, and the X-, Y-Sign and Pen buffer register 1008 are shown in further detail in FIG. 12D. The output terminals RS12, RS11, RS1, RS2, RS4 and RS8 from the amplifiers 1002 and 1004 in FIG. 12A are connected to corresponding flip-flops in the buffer registers 1006 and 1008 in FIG. 12D. For example, the X-, Y-Plot Data buffer register 1006 is made up of a first set of flip-flops BX1, BX2, BX4 and BX8; a second set of flip-flops BX10, BX20, BX40 and BX80; a third set of flip-flops BY1, BY2, BY4, BY8; and a fourth set of flip-flops BY10, BY20, BY40 and BY80. The first set of BX flip-flops is coupled to the second set through an amplifier 1100, whereas the first set of BY flip-flops is coupled to the second set through an amplifier 1102.

The buffer register 1008 includes a pen position flip-flop BPD, as well as an X-sign flip-flop BMX and a Y-sign flip-flop BMY. It will be remembered that the BPD flip-flop is under the control of punches at the No. 12 row on the card being scanned, whereas the BMX and BMY flip-flops are under the control of punches at selected columns in the No. 11 row.

The column counter 1004 is made up of three flip-flops designated CAM1, CAM2 and CAM3 (FIG. 12B). These flip-flops are connected as a binary counter, and they respond to clock pulses CAM derived from the control circuit of FIG. 12C. These clock pulses are introduced to an input terminal 1104 connected to an AND-gate 1106 which, in turn, is connected to the binary counter. The AND-gate 1106 is disabled when the flip-flop CAM4 is set, so that the column counter is stopped at the fourth count, until it is reset to zero by the BR (buffer reset) pulse derived from the amplifier 1108.

The outputs from the binary counter flip-flops CAM1, CAM2 and CAM4 of FIG. 12B are applied to a series of AND-gates 1110, 1112, 1114 and 1116. The AND-gates are connected to respective amplifiers 1118, 1120, 1122 and 1124, and the timing signals D1, D2, D3 and D4 are produced at the outputs of the respective amplifiers, as the binary counter is stepped from one state to another. The timing signals correspond to the columns of the card of FIG. 13 being successively sensed as each field of the card is processed.

The timing signals D1, D2, D3 and D4 are applied to the flip-flops of FIG. 12D which make up the buffer registers 1006 and 1008. The timing control is such that when the first column of a field of a card is being read, the corresponding data is channelled, by means of the D1 timing pulse, into the flip-flops BX10, BX20, BX40, BX80 of FIG. 12D; when the second column is being sensed, the corresponding signals are channelled by the timing signal D2 into the flip-flops BX1, BX2, BX4 and BX8; when the third column is being sensed, the corresponding signals are channelled by the timing signal D3 into the flip-flops BY10, BY20, BY40, BY80; and when the fourth column is being sensed, the corresponding signals are channelled by the timing signal D4 into the flip-flops BY1, BY2, BY4 and BY8.

As mentioned above, the above-enumerated flip-flops in FIG. 12D make up the Plot Data buffer register 1006, and the corresponding units and tens digits of the X-command, and the corresponding units and tens digits of the Y-command, are stored in the buffer in binary coded decimal form. Also at D3 time, the twelfth row of the card being processes is sensed, to determine whether the BPD flip-flop in the register 1008 is to be set, corresponding to a pen down (Z) command. In the same manner, the eleventh row is sensed at D2 time to determine the setting of the X-sign flip-flop BMX; and at D4 time to determine the setting of the Y-sign flip-flop BMY.

Figure 12E:
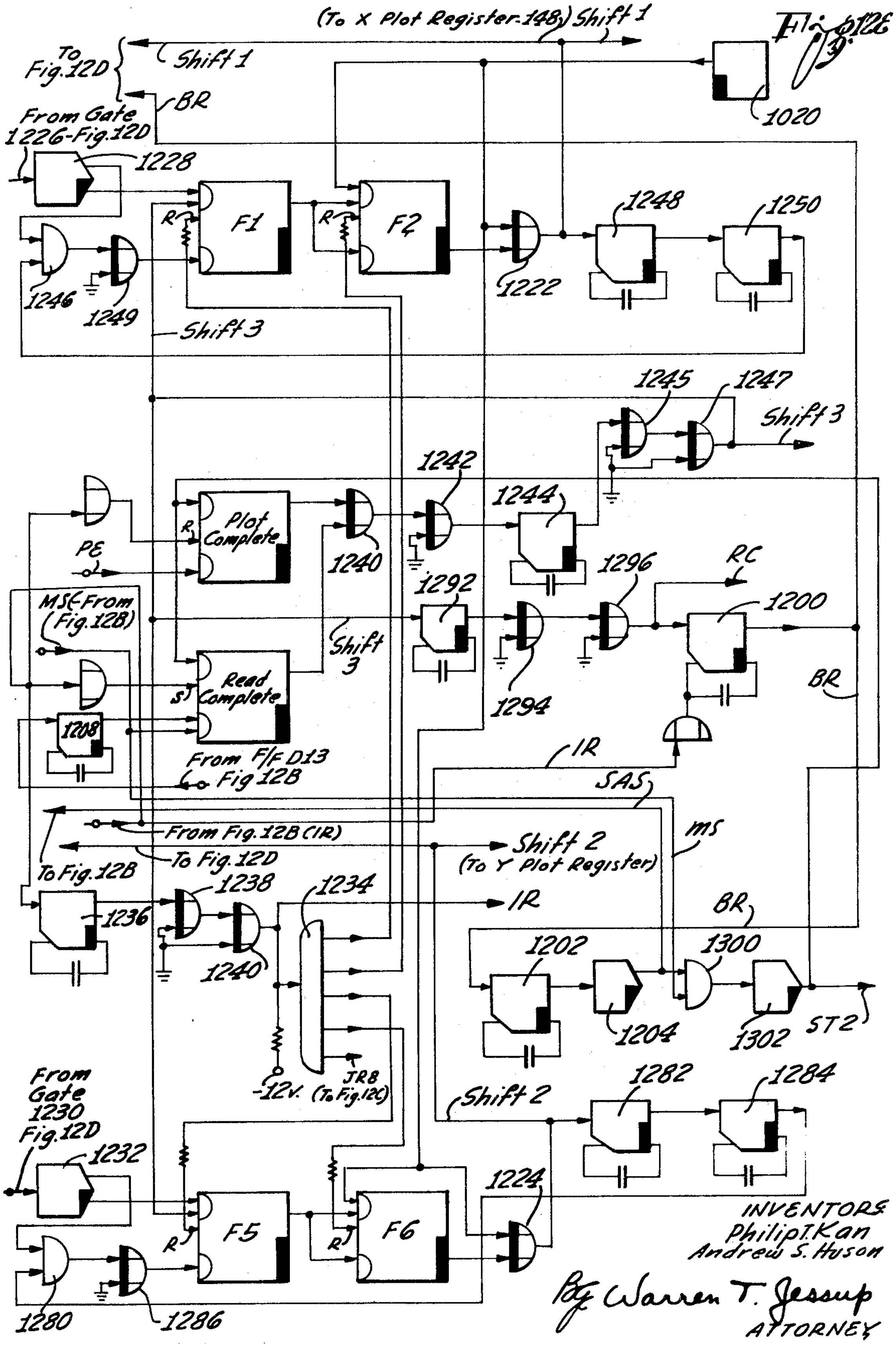

After the information in the buffer registers 1006 and 1008 has been shifted into the plot registers 148 and 148A (FIG. 11) in a manner to be described, the buffer reset (BR) signal derived from the circuit of FIG. 12E, and amplified in an amplifier 1130 (FIG. 12D) is applied to the flip-flops of the buffer registers to reset the flip-flops. The BR signal is also applied to the column counter of FIG. 12B, as described above.

The serial transfer of information from the buffer registers 1006 and 1008 to the plot registers 148 and 148A is effectuated by the circuitry of FIG. 12E. This circuitry, in turn, is controlled by the control circuitry of FIG. 12B. The control circuitry of FIG. 12B includes a manual start flip-flop MS and an automatic start flip-flop AS. The control circuitry of FIG. 12B also includes a switch labeled "Reset," and a switch labeled "Start." When the system is first placed in operation, the switch "Reset" is first depressed, and an initial pulse IR is generated so that the various flip-flops in the system may be established in the desired initial operating condition. After the "Reset" switch has been depressed, so as to establish the flip-flops of the system in the desired operating condition, the "-Start" switch is then depressed, so as to set the manual start flip-flop MS. The system is then in condition for operation. However, before a card will be shifted in the card reader 1000 of FIG. 11 from one four-column field to the next, the automatic start (AS) flip-flop must also be set. This flip-flop is set by the term SAS which is derived from the circuit of FIG. 12E after the term BR has reset the buffer registers 1006 and 1008.

When the "Reset" switch is closed, the one-shot multivibrator 1200 is caused to generate the BR signal, so that the buffer registers of FIG. 12D are all reset, and ready to receive information. At this time, the BR-pulse also is introduced to a one-shot multivibrator 1202 in FIG. 12E, so that the resulting output pulse from the one-shot multivibrator, as amplified by an amplifier 1204, develops the SAS-pulse which, in turn, sets the automatic start flip-flop AS.

Then, when the "Start" switch is closed, to start the system, the manual start flip-flop (MS) is changed from its reset to its set condition, so that the system immediately is placed into operation. The system then proceeds to read the first field of information of the first card, in the manner described above, with the information being stored in the buffer registers of FIG. 12D.

The Read Complete flip-flop (FIG. 12E) is originally set by the IR-pulse derived from the circuit of FIG. 12B when the "Reset" switch was closed. Then, when the fourth column of the particular field of the card being processed has been read, a flip-flop D13 in FIG. 12B is set, and this triggers a one-shot multivibrator 1208 in FIG. 12E which, in turn, resets the Read Complete flip-flop. We now have the condition where both the Plot Complete flip-flop and the Read Complete flip-flop of FIG. 12E are both reset, and we are ready to shift the first field of information, which is now in the buffer of FIG. 12D, serially into the X-, Y-plot register 148 (FIG. 11). This is achieved by the flip-flops F2 and F6 of FIG. 12E.

It will be appreciated that so long as the flip-flop F1 is reset, the setting of the flip-flop F2 is prevented. Also, so long as the flip-flop F5 is reset, the setting of the flip-flop F6 is prevented. The flip-flops F1 and F5 are originally reset by a reset signal derived from a DC reset gate 1234 in FIG. 12E. This reset signal is derived in response to the IR-pulse which occurs when the "Reset" switch of FIG. 12B was originally closed, the pulse being introduced to a one-shot multivibrator 1236, whose output pulse is passed through a pair of inverters 1238 and 1240 to the input of the DC reset gate 1234.

When the system is first placed into operation, the flip-flops F1, F2 and F5, F6 are reset.

The "Shift 3" pulse is produced when both the Read Complete and Plot Complete flip-flops of FIG. 12E are reset, indicating that the plotter is ready for the next commands. When that occurs a gate 1240 produces an output which is passed through an inverter 1242 and used to trigger a one-shot multivibrator 1244. The output of the one-shot multivibrator 1244 produces the "Shift 3" pulse at the output of a pair of inverters 1245 and 1247 (FIG. 12E).

It will be remembered that during the initial starting of the system, the Plot Complete flip-flop of FIG. 12E was originally reset, and the Read Complete flip-flop was originally set. The Read Complete flip-flop was subsequently reset, by the output of the one-shot multivibrator 1208, after sufficient time had elapsed to permit the buffer of FIG. 12D to be completely loaded, under the control of the flip-flop D13 of FIG. 12B.

Then, when the "Shift 3" pulse is produced, signalling that the contents of the buffer 1006 of FIG. 12D is ready to be shifted serially into the plot register 148 of FIG. 11, both the flip-flops F1 and F5 are set. This permits the next clock pulse from the source 1020 to set the flip-flops F2 and F6 so that the serial transfer may begin.

The clock pulses from the source 1020 set both the flip-flops F2 and F6, so as to enable respective gates 1222 and 1224 at their outputs. The gate 1222 then passes the clock pulses from the source 1020 to produce the series of "Shift 1" pulses, for the X-section of the buffer 1006 of FIG. 12D, and likewise the gate 1224 produces the "Shift 2" pulses for the Y-section of the buffer 1006. As mentioned above, the "Shift 1" pulses are also used to count the X-section of the buffer 1006 of FIG. 12D to zero, and the "Shift 2" pulses are also used to count the Y-section to zero on an independent basis.

When the X-section of the buffer 1006 reaches zero, a gate 1226 in FIG. 12D is enabled, and its output is amplified by an amplifier 1228 in FIG. 12E. Likewise, when the Y-section of the buffer 1006 of FIG. 12D is independently counted to zero, a gate 1230 produces an output which is amplified by a gate 1232 in FIG. 12E.

When the X-section of the buffer 1006 of FIG. 12D reaches zero, the resulting output from the amplifier 1228 in FIG. 12E enables a gate 1246, so that the next clock pulse, (derived through a pair of one-shot multivibrators 1248 and 1250) can pass through the gate 1246 and through an inverter 1249 to reset the flip-flop F1. This, of course, resets the flip-flop F2, so as to disable the gate 1222, and prevent any further serial transfer in the system between the X-section of the buffer 1006 of FIG. 12D and the plot register 148 of FIG. 11.

Likewise, when the Y-section of the buffer 1006 of FIG. 12D has been counted to zero, the resulting output from the amplifier 1232 enables a gate 1280, so that the next pulse output from the gate 1224, (derived through a pair of one-shot multivibrators 1282 and 1284) can pass through the gate, and through an inverter 1286 to reset the flip-flop F5, and terminate the serial transfer of information from the Y-portion of the buffer 1006 of FIG. 12D to the register 148 in the delta generator of FIG. 11.

After the system has been initially started, the manual start flip-flop MS of FIG. 12B remains set, and the system proceeds to read the columns of the card from field to field automatically, under the control of the automatic start flip-flop AS. To effectuate the latter control, the "Shift 3" pulse, as it appears at the output of the inverter 1247, is also used to trigger a one-shot multivibrator 1292 in FIG. 12E. The pulse output from the one-shot multivibrator 1292 is passed through a pair of inverters 1294 and 1296, so as to produce an output pulse RC after both parts of the buffer 1006 of FIG. 12D have been counted to zero. The pulse RC also is used to trigger the one-shot multivibrator 1200, so that the buffer reset pulse (BR) may be generated immediately thereafter.

It will be appreciated that the RC pulse is produced after both the X- and Y-Sections of the buffer 1006 of FIG. 12D have been counted to zero, so that the buffer is ready to receive the next field of information. The BR pulse, as mentioned above, then triggers the one-shot multivibrator 1202 in FIG. 12E, so as to develop the SAS-pulse which, in turn, again set the Automatic Start flip-flop, so that the system can proceed to process the next 4-column field of the card. The SAS pulse is also applied to a gate 1300 which is enabled when the manual start flip-flop MS is set. If this latter gate is enabled, the SAS-pulse is passed through an amplifier 1302 to develop the ST2 pulse which starts the plotter, as described in the previous embodiment.

The output ST2 pulse is also used to set the Plot Complete and Read Complete flip-flops of FIG. 12E. Now, when the next field of information from the card is placed in the buffer 1006 of FIG. 12D, the Read Complete flip-flop is reset. Then, when the previous commands in the plot register 148 have actually been used to control the plotter, the PE-signal from the N-counter of the delta generator resets the Plot Command flip-flop, so that information can again be serially transferred from the buffer 1006 of FIG. 12D to the plot register 148 of FIG. 11, as described above.

Also, in the embodiment being described, the "Shift 3" pulse controls the production of the RC signal for the delta generator, so that the clock rate selector 146 may be reset, in order that it may later be set to the desired rate by the SC pulse.

Returning now to FIG. 12B, it will be appreciated that when the manual start flip-flop MS is set, a lamp driver 1400 causes an indicator lamp 1402 to be energized. Likewise, when the automatic start flip-flop AS is set, a lamp driver 1404 causes an indicator lamp 1406 to be energized. A further pair of indicator lamps 1408 and 1410 are energized when the power is turned on.

Note in FIG. 12B that the D3 timing pulse is returned to the automatic start flip-flop AS to reset the flip-flop and stop the card reader 1000 after each 4-column field of information has been transferred from the card to the buffer 1006 of FIG. 12D. The reader itself is actually stopped at D4 time, but the stopping signal is taken at D3 time, because it takes one clock time for the reader to react.

It should be noted that the BPD, BMX, BMY signals from the buffer 1006 of FIG. 12D are applied to the plot register 148A delta generator of FIG. 11 by independent leads, and these are shifted into the delta generator at the "Shift 3" pulse time, as described in the previous embodiment.

When a punch is sensed on the zero row of the card a pulse RS10 is produced by the circuit of FIG. 12A. This pulse is applied to the manual start (MS) flip-flop in FIG. 12B and causes that flip-flop to be reset. This stops the system, and it must be set manually before it can be started again.

The various control signals derived from the card reader 1000 are applied to the circuit shown in FIG. 12C. The card reader clock signal $\overline{CCL}$*, for example, is applied through a pair of inverters 1500 and 1502 to a one-shot multivibrator 1504. The pulses from the one-shot multivibrator 1504 are passed through an AND-gate 1506 and through an inverter 1508 to a one-shot multivibrator 1510. The multivibrator 1510 produces the clock pulses CAM which are applied to the column counter 1004 of FIG. 12B to step the counter.

It will be remembered that the first four columns of each card are used for identification purposes. Therefore, it is important that the information of the first four columns is not transferred to the buffer register 1006 of FIG. 12D. This inhibition is under the control of the $\overline{CFD}$* term in FIG. 12C.

In reading each card, the $\overline{CFD}$ term generates two pulses; the first one is just before the first column and the second is just after the fourth column. The flip-flop D11 is initially reset by the reset switch. The first $\overline{CFD}$* pulse in FIG. 12C sets the flip-flop D11 through an inverter 1512, thereby inhibiting the gate 1506. This prevents any triggering of the one-shot multivibrator 1510 thereby stopping the clocks CAM; and it also sets the load buffer term false, so that the gates 1110, 1112, 1114 and 1116 in the logic circuitry of FIG. 12B are disabled. Therefore, so long as the flip-flop D11 is set, the circuit of FIG. 12B cannot produce the column timing pulses D1, D2, D3 and D4, and there is no transfer of any information into the buffer 1006 of FIG. 12D.

The second $\overline{CFD}$ pulse of the first field of the card is then sensed, and this resets the flip-flop D11. The AND-gate 1506 is now enabled, so that the clock CAM is again started. Also, the load buffer term is again made true, so that the timing pulses D1, D2, D3 and D4 in FIG. 12B can be again generated. Therefore, when the second four-column field of the card is reached, the information can be transferred into the buffer register 1006 of FIG. 12D, in the manner described.

As shown, a Schmitt trigger 1516 is interposed in the input to the inverter 1512, so as to produce reenforced triggering pulses for the flip-flop D11, in response to the term $\overline{CFD}$*. Likewise, a Schmitt trigger 1518 is interposed at the input to the inverter 1500, so as to reenforce the clock pulses $\overline{CCL}$* which trigger the one-shot multivibrator 1504.

The card reader also has a manual/automatic switch, which can be set either to "manual" or to "automatic." When the switch is set to "automatic," the system of the present invention can take over the control of the operation, in the manner described. Alternately, when the switch is set to "manual," the sensing of the card being processed will proceed to completion and the reader will stop.

The card reader also produces a term SBC, as the processing of the last field of any particular card is nearing completion the term SBC becomes true. Therefore, when the system is set to "manual," by the manual/automatic switch, for example, the resulting term SMF* becomes true and is passed by the inverters 1518 and 1520 and applied to an AND-gate 1522. Since the register switch is not depressed at that moment, $\overline{SMR}$* will be true, therefore, the output of the AND-gate 1522 will be true. The true output from the AND-gate 1522 is inverted by the inverter 1524 which disables the AND-gate 1526. When the AND-gate 1526 is disabled, an inverter 1528 at its output causes a signal level applied to the card reader to take on a value which causes the card reader to stop.

The provision of the manual/automatic switch, for example, will permit the operator to insert an extra card into the sequence. To achieve this purpose, the operator merely sets the switch to "manual," and this will cause the system to stop at the end of the card then being processed, as described above. The operator can then place the extra card on the read table of the card reader, and cause it to move to the card reader "ready" station. When a card is in the ready station, the operator closes the register switch ($\overline{SMR}$*), in order to place the card reader and plotter into operation.

When the register switch is depressed ($\overline{SMR}$*), a pair of inverters 1530 and 1532 introduce the term $\overline{SMR}$ to the AND-gate 1522 and to a further AND-gate 1534. It might be pointed out at this point that a similar pair of inverters 1536 and 1538 are used to introduce the SBC pulse to the AND-gate 1522. When the register switch is operated, $\overline{SMR}$ becomes false, and the output from the AND-gate 1534 also becomes false. The false output from the AND-gate 1534 is inverted by an inverter 1540. This enables the AND-gate 1526 and causes the reader to feed the first card from the reading table into the reading or sensing station, and this initiates the reading of the first card by the reader.

A further term $\overline{SRR}$* is also derived from the card reader. This latter term is passed by a pair of inverters 1542 and 1544 to produce the term $\overline{SRR}$. This latter term becomes true whenever there is no card in the reading station of the card reader. This occurs, for example, at the end of a deck of cards. When that condition arises, the output from the AND-gate 1534 becomes true and disables the AND-gate 1526, so that the card reader is stopped, as is desired.

As each card enters the reading station of the card reader for processing, a pressure roller moves down on the card and grasps it firmly, so that there will be proper registration between the card and the card reader. When the pressure roller is raised, there must be no movement of the card, so that the term $\overline{SPR}$* is set true under those conditions. This latter term is passed by the inverters 1548 and 1550 and applied to an AND-gate 1552. This enables the AND-gate 1552, so that the next clock pulse CCL from the inverter 1500 is passed by the AND-gate 1552, inverted by an inverter 1554, and used to disable the gate 1526, so as to stop the card movement. The same pulse is used to trigger a one-shot multivibrator 1556 whose output is again introduced to the AND-gate 1526 through an inverter 1558. The effect of this is to paralyze the AND-gate and hold it disabled for a predetermined time, as established by the one-shot multivibrator 1556. This permits the next card to enter the reading station of the card reader partially and stop, so as to permit the pressure rollers to move down on the new card while it is in the stopped condition. The next card is then moved through the reading station.

Finally, the card reader is controlled by the AS term from the circuit of FIG. 12B. This term is coupled through an inverter 1562 to the AND-gate 1526, so that the AND-gate 1526 may be disabled by the term AS to stop the card reader. Likewise, the term AS can start the card reader, when the system is under automatic operation, and when all the previous conditions established in FIG. 12C have been fulfilled.

It will be appreciated, of course, that while various embodiments of the invention have been described, modifications may be made. It is intended in the claims to cover all modifications which come within the scope of the invention.

What is claimed is:

1. A digital incremental plotter system including:

a source of digital data for producing succession of blocks of binary coded instructions, each instruction containing a first command coded to represent a predetermined number of incremental steps along one axis and a second command coded to represent a predetermined number of incremental steps along a second axis;

register means having output terminals;

sensing means coupled to said source for introducing successive ones of said instructions into said register means;

an incremental plotter including means incrementally movable along a first axis and a second axis;

generator means having input terminal means electrically connected to said output terminals of said register means and responsive to the first and second commands of the instruction therein to generate a pulse signal containing pulses corresponding to the first mentioned and second mentioned predetermined numbers so as to cause said incremental plotter to move incrementally along said first axis and along said second axis a corresponding number of incremental steps; and a source of clock pulses for driving said generator means at a rate determined by the repetition rate of the clock pulses from said last-named source, and which includes a clock rate selector circuit having input terminal means electrically connected to said output terminals of said register means and responsive to the value of the instruction therein to determine the repetition rate of the clock pulses produced by said last-named source.

2. The system defined in claim 1, in which said selector circuit responds to the one of said first and second commands in the instruction in said register means having the greater value.

3. A digital incremental plotter system including:

a source of digital data for producing a succession of blocks of binary coded instructions, each instruction containing a first command coded to represent a predetermined number of incremental steps along one axis and a second command coded to represent a predetermined number of incremental steps along a second axis;

register means having output terminals;

sensing means coupled to said source for introducing successive ones of said instructions into said register means;

an incremental plotter including means incrementally movable along a first axis and a second axis;

generator means having input terminal means electrically connected to said output terminals of said register means and responsive to the first and second commands of the instruction therein to generate a pulse signal containing pulses corresponding to the first mentioned and second mentioned predetermined numbers so as to cause said incremental plotter to move incrementally along said first axis and along said second axis a corresponding number of incremental steps, said generator means including logic gate circuitry coupled to said register means;

a counter coupled to said gate circuitry to cause said gate circuitry to pass a predetermined number of pulses for a predetermined number of counting steps of said counter as established by the particular instruction in said register means; and a source of clock pulses for driving said counter at a rate determined by the repetition rate of the clock pulses from said last-named source, and which includes a clock rate selector circuit having input terminal means electrically connected to said output terminals of said register means, and responsive to the value of the instruction in said register means to determine the repetition rate of the clock pulses to be produced by said last-named source.

* * * * *